(12) United States Patent
Yamaura

(10) Patent No.: US 10,477,268 B2
(45) Date of Patent: Nov. 12, 2019

(54) INFORMATION PROCESSING APPARATUS, COMMUNICATION SYSTEM, INFORMATION PROCESSING METHOD AND NON-TRANSITORY COMPUTER READABLE MEDIUM

(71) Applicant: SONY CORPORATION, Tokyo (JP)

(72) Inventor: Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 115 days.

(21) Appl. No.: 15/554,485

(22) PCT Filed: Mar. 2, 2016

(86) PCT No.: PCT/JP2016/001133
§ 371 (c)(1),
(2) Date: Aug. 30, 2017

(87) PCT Pub. No.: WO2016/143304
PCT Pub. Date: Sep. 15, 2016

(65) Prior Publication Data
US 2018/0048933 A1    Feb. 15, 2018

(30) Foreign Application Priority Data

Mar. 12, 2015  (JP) .................................. 2015-049332

(51) Int. Cl.
*H04N 21/439* (2011.01)
*H04N 21/233* (2011.01)
(Continued)

(52) U.S. Cl.
CPC ..... *H04N 21/4398* (2013.01); *H04L 65/4092* (2013.01); *H04L 65/607* (2013.01);
(Continued)

(58) Field of Classification Search
CPC ........... H04N 21/2335; H04N 21/2368; H04N 21/2662; H04N 21/4307; H04N 21/4316;
(Continued)

(56) References Cited

U.S. PATENT DOCUMENTS

2010/0061466 A1    3/2010  Gozen et al.
2015/0036695 A1 *  2/2015  Gowda ................. H04L 47/283
                                                    370/474
(Continued)

FOREIGN PATENT DOCUMENTS

CN        105340330 A     2/2016
EP        2134013 A1     12/2009
(Continued)

OTHER PUBLICATIONS

Office Action for JP Patent Application No. 2015-049332, dated Nov. 6, 2018, 03 pages of Office Action and 03 pages of English Translation.

(Continued)

*Primary Examiner* — Omar S Parra
(74) *Attorney, Agent, or Firm* — Chip Law Group

(57) ABSTRACT

Provided is an information processing apparatus that includes circuitry configured to receive a multiplexed image signal and sound signal from another information processing apparatus using a moving picture experts group (MPEG) 2-transport stream (TS); and perform control to cause reduction of data contained in a packetized elementary stream (PES) payload in a PES packet packed in a transport (TS) packet specified by a packet identifier (PID) specifying sound data transmission described in a program map table (PMT) and to extract a presentation time stamp (PTS) contained in a PES header portion of the PES packet after requesting the another information processing apparatus to reduce a sound data amount.

17 Claims, 31 Drawing Sheets

(51) Int. Cl.

| | |
|---|---|
| H04N 21/2368 | (2011.01) |
| H04N 21/2662 | (2011.01) |
| H04N 21/43 | (2011.01) |
| H04N 21/431 | (2011.01) |
| H04N 21/434 | (2011.01) |
| H04N 21/6377 | (2011.01) |
| H04N 21/643 | (2011.01) |
| H04L 29/06 | (2006.01) |
| H04L 29/08 | (2006.01) |
| H04N 5/765 | (2006.01) |
| H04N 9/806 | (2006.01) |
| H04N 21/4363 | (2011.01) |
| H04N 21/442 | (2011.01) |

(52) U.S. Cl.
CPC .............. *H04L 67/18* (2013.01); *H04L 69/04* (2013.01); *H04N 5/765* (2013.01); *H04N 9/8063* (2013.01); *H04N 21/2335* (2013.01); *H04N 21/2368* (2013.01); *H04N 21/2662* (2013.01); *H04N 21/4307* (2013.01); *H04N 21/4316* (2013.01); *H04N 21/4343* (2013.01); *H04N 21/4347* (2013.01); *H04N 21/4348* (2013.01); *H04N 21/4363* (2013.01); *H04N 21/44218* (2013.01); *H04N 21/6377* (2013.01); *H04N 21/643* (2013.01)

(58) Field of Classification Search
CPC .......... H04N 21/4343; H04N 21/4347; H04N 21/4348; H04N 21/4363; H04N 21/4398; H04N 21/44218; H04N 21/6377; H04N 21/643; H04N 5/765; H04N 9/8063; H04L 29/06469; H04L 29/06489; H04L 29/06517; H04L 5/0048; H04L 65/4092; H04L 65/607; H04L 67/18; H04L 69/04; H04W 16/14; H04W 16/32; H04W 72/0466; H04W 72/12; H04W 84/042; H04W 88/08

See application file for complete search history.

(56) References Cited

U.S. PATENT DOCUMENTS

| | | | |
|---|---|---|---|
| 2015/0208161 A1* | 7/2015 | Lesaffre | H04N 21/4126 381/74 |
| 2016/0127424 A1 | 5/2016 | Lee et al. | |
| 2016/0182924 A1* | 6/2016 | Todd | H04N 21/2343 725/116 |

FOREIGN PATENT DOCUMENTS

| | | |
|---|---|---|
| EP | 3016441 A1 | 5/2016 |
| JP | 11-177515 A | 7/1999 |
| JP | 2001-266502 A | 9/2001 |
| JP | 2002-176434 A | 6/2002 |
| JP | 2005-123789 A | 5/2005 |
| JP | 2007-028212 A | 2/2007 |
| JP | 2007-259037 A | 10/2007 |
| JP | 2009-111955 A | 5/2009 |
| JP | 2011-250476 A | 12/2011 |
| JP | 2012-248979 A | 12/2012 |
| JP | 5119239 B2 | 1/2013 |
| JP | 2014-096074 A | 5/2014 |
| KR | 10-2016-0026866 A | 3/2016 |
| WO | 2008/047054 A2 | 4/2008 |
| WO | 2008/117524 A1 | 10/2008 |
| WO | 2014/208878 A1 | 12/2014 |

OTHER PUBLICATIONS

Office Action for JP Patent Application No. 2015-049332, dated Mar. 20, 2018, 07 pages of Office Action and 04 pages of English Translation.

Examination Report for SG Patent Application No. 11201707143X, dated Apr. 12, 2018, 06 pages.

International Search Report and Written Opinion of PCT Application No. PCT/JP2016/001133, dated Jun. 15, 2016, 10 pages of ISRWO.

Office Action for EP Patent Application No. 16715115.8, dated Aug. 7, 2018, 06 pages of Office Action.

\* cited by examiner

[Fig. 1]
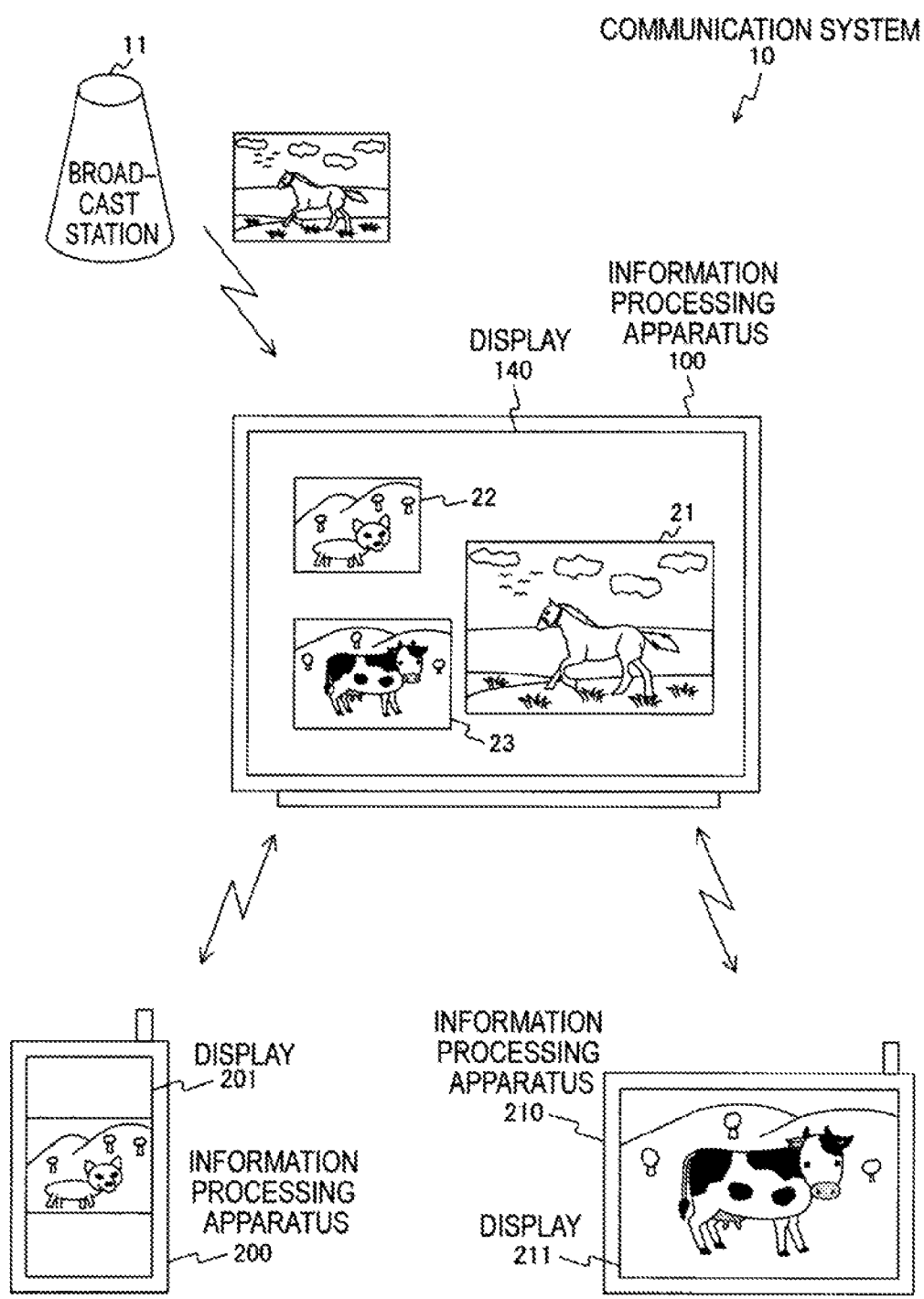

[Fig. 2]
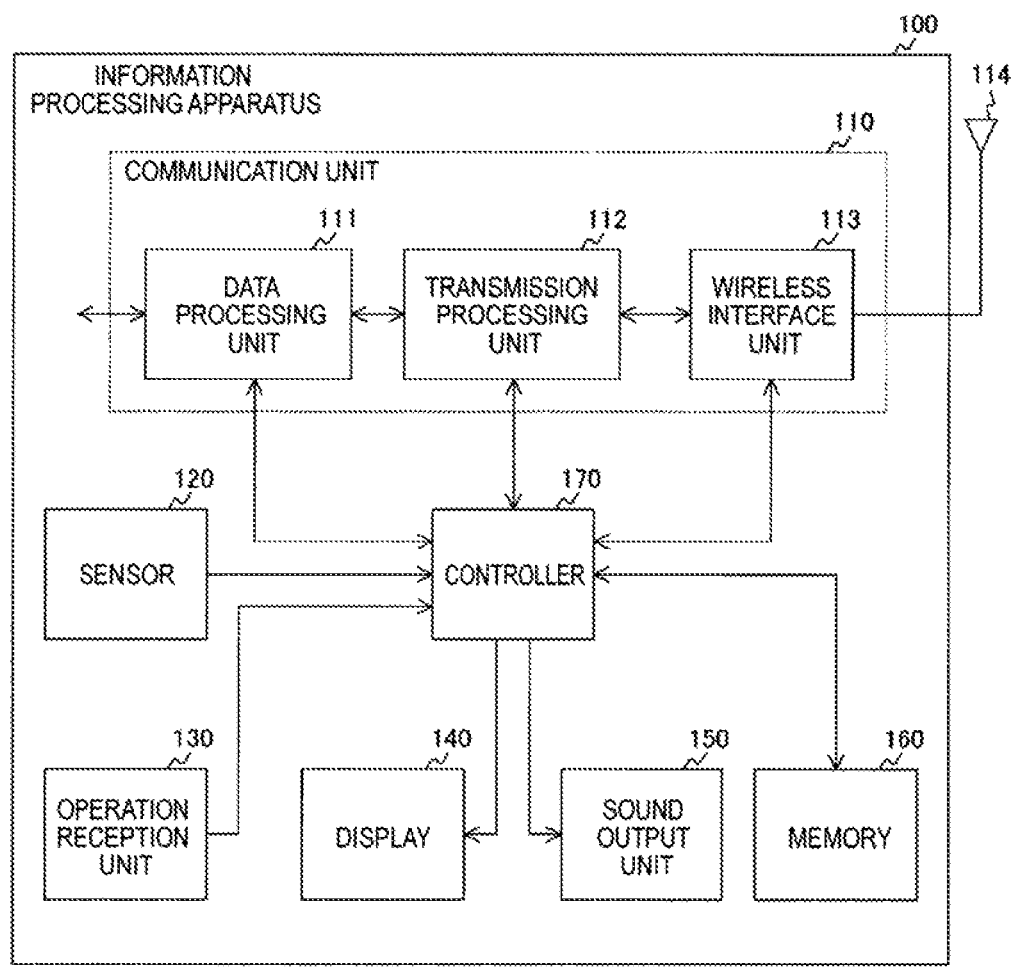

[Fig. 3]
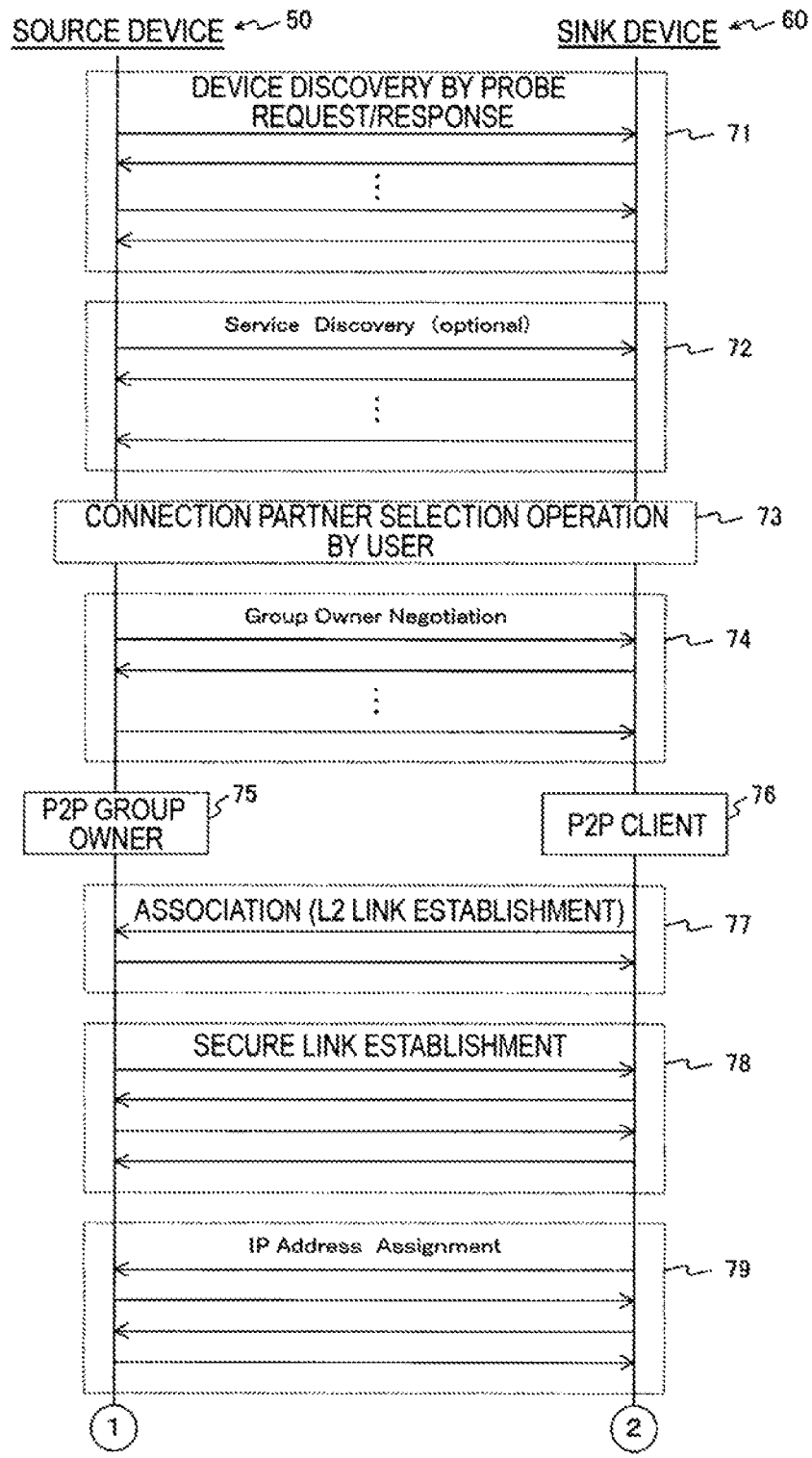

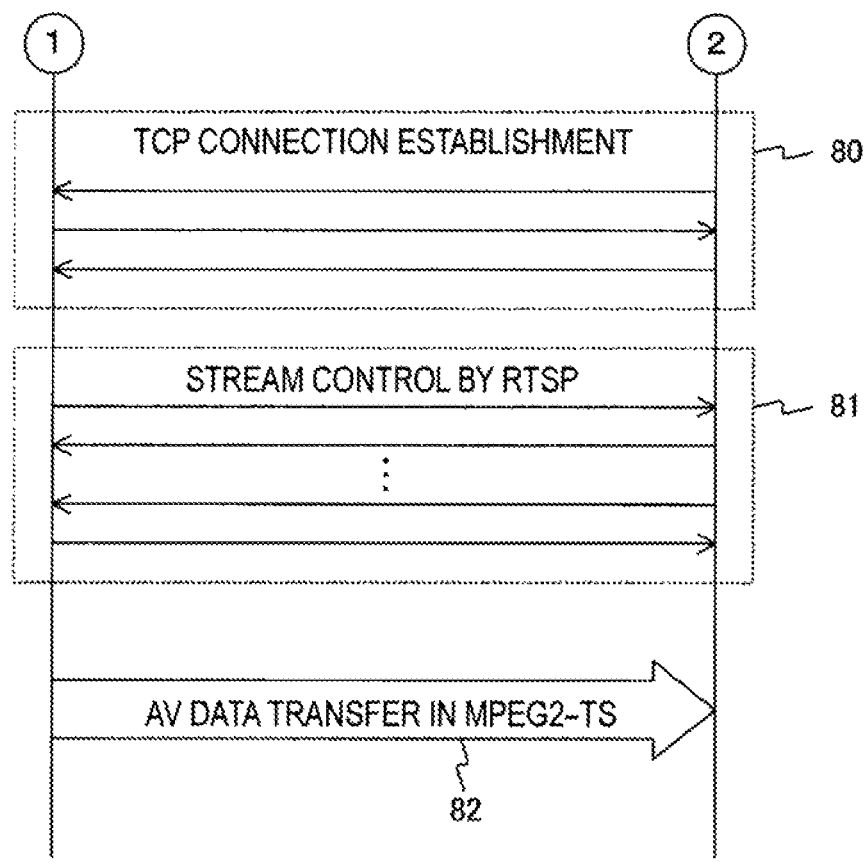
[Fig. 4]

[Fig. 5]
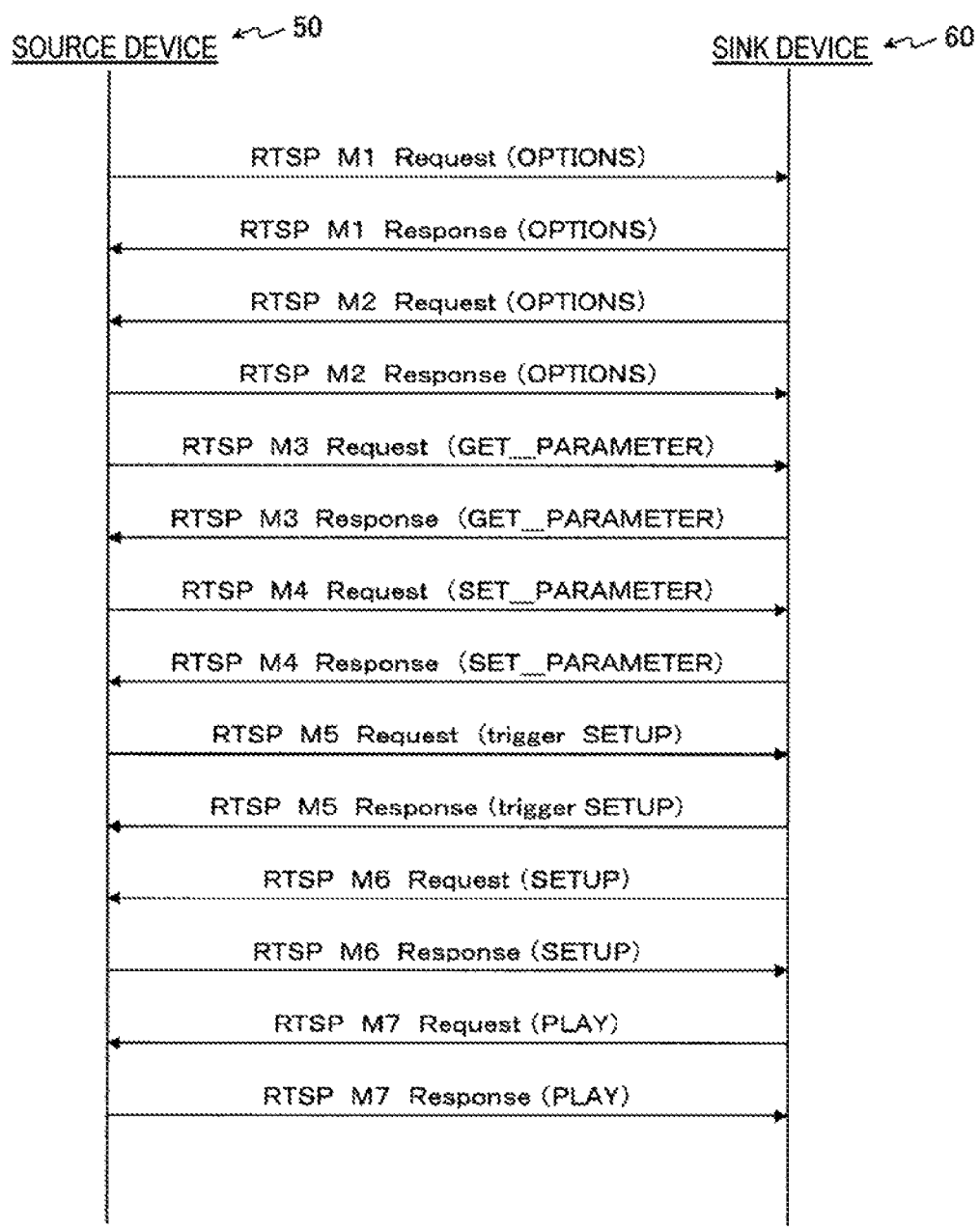

[Fig. 6]

| Message ID | req./res (direction) | RTSP message |
|---|---|---|
| M1 | request (src→snk) | OPTIONS *RTSP/1.0<br>CSeq: i<br>Require: org.wfa.wfd1.0 |
| M1 | response (snk→src) | RTSP/1.0 200 OK<br>CSeq: i<br>Date: Sun, Aug 21 2011 04:20:53 GMT<br>Public: org.wfa.wfd1.0, GET_PARAMETER, SET_PARAMETER |
| M2 | request (snk→src) | OPTIONS *RTSP/1.0<br>CSeq: j<br>Require: org.wfa.wfd1.0 |
| M2 | response (src→snk) | RTSP/1.0 200 OK<br>CSeq: j<br>Date: Sun, Aug 21 2011 04:20:53 GMT<br>Public: org.wfa.wfd1.0, SETUP, TEARDOWN, PLAY, PAUSE,<br>      GET_PARAMETER, SET_PARAMETER |
| M3 | request (src→snk) | GET_PARAMETER rtsp://localhost/wfd1.0 RTSP/1.0<br>CSeq: i+1<br>Content-Type: text/parameters<br>Content-Length: 141<br><br>wfd_video_formats<br>wfd_audio_codecs<br>wfd_3d_video_formats<br>wfd_content_protection<br>wfd_display_edid<br>wfd_coupled_sink<br>wfd_client_rtp_ports |
| M3 | response (snk→src) | RTSP/1.0 200 OK<br>CSeq: i+1<br>Content-Length: 290<br>Content-Type: text/parameters<br><br>wfd_video_formats: 00 00 01 01 00000001 00000000 00000000<br>      00 0000 0000 00 none none<br>wfd_audio_codecs: LPCM 00000003 00<br>wfd_3d_video_formats: none<br>wfd_content_protection: none<br>wfd_display_edid: none<br>wfd_coupled_sink: none<br>wfd_client_rtp_ports: RTP/AVP/UDP;unicast 1028 0 mode=play |

[Fig. 7]

| Message ID | req/res (direction) | RTSP message |
|---|---|---|
| M4 | request (src→snk) | SET_PARAMETER rtsp://localhost/wfd1.0 RTSP/1.0<br>CSeq: i+2<br>Content-Type: text/parameters<br>Content-Length: 302<br><br>wfd_video_formats: 00 00 01 01 00000001 00000000 00000000<br>00 0000 0000 00 none none<br>wfd_audio_codecs: LPCM 00000002 00<br>wfd_presentation_URL: rtsp://10.82.24.140/wfd1.0/streamid=0 none<br>wfd_client_rtp_ports: RTP/AVP/UDP;unicast 1028 0 mode=play |
| | response (snk→src) | RTSP/1.0 200 OK<br>CSeq: i+2 |
| M5 | request (src→snk) | SET_PARAMETER rtsp://localhost/wfd1.0 RTSP/1.0<br>CSeq: i+3<br>Content-Type: text/parameters<br>Content-Length: 27<br><br>wfd_trigger_method: SETUP |
| | response (snk→src) | RTSP/1.0 200 OK<br>CSeq: i+3 |
| M6 | request (snk→src) | SETUP rtsp://10.82.24.140/wfd1.0/streamid=0 RTSP/1.0<br>CSeq: j+1<br>Transport: RTP/AVP/UDP;unicast;client_port=1028 |
| | response (src→snk) | RTSP/1.0 200 OK<br>CSeq: j+1<br>Session: 6B8B4567;timeout=30<br>Transport: RTP/AVP/UDP;unicast;client_port=1028;server_port=5000 |
| M7 | request (snk→src) | PLAY rtsp://10.82.24.140/wfd1.0/streamid=0 RTSP/1.0<br>CSeq: j+2<br>Session: 6B8B4567 |
| | response (src→snk) | RTSP/1.0 200 OK<br>Date. Sun, Aug 21 2011 04:20:53 GMT<br>CSeq: j+2 |

[Fig. 8]

```
wfd-audio-stream-control    = "wfd_audio_stream_control:" SP stream-control CRLF
stream-control  = "none" / control-bitmap; "none" if not supported
control-bitmap = 1*1HEXDIG; see table below, only one bit set at M110.
```

| BIT POSITION | NAME | MEANING |
|---|---|---|
| B3 | (re-) include audio | AUDIO DATA IS TO BE (RE)INCLUDED |
| B2 | reduce audio | AUDIO DATA IS TO BE REDUCED |
| B1:B0 | reserved | RESERVATION, SET TO "0" |

[Fig. 9]

EXAMPLE OF RTSP M3 REQUEST AND RTSP M3 RESPONSE

| Message ID | req/res (direction) | RTSP message |
|---|---|---|
| M3 | request (src→snk) | GET_PARAMETER rtsp://localhost/wfd1.0 RTSP/1.0<br>CSeq: i+1<br>Content-Type: text/parameters<br>Content-Length: 165 ～401<br><br>wfd_video_formats<br>wfd_audio_codecs<br>wfd_3d_video_formats<br>wfd_content_protection<br>wfd_display_edid<br>wfd_coupled_sink<br>wfd_client_rtp_ports<br>wfd_audio_stream_control ～402 |
| | response (snk→src) | RTSP/1.0 200 OK<br>CSeq: i+1<br>Content-Length: 317 ～403<br>Content-Type: text/parameters<br><br>wfd_video_formats: 00 00 01 01 00000001 00000000 00000000<br>    00 0000 0000 00 none none<br>wfd_audio_codecs: LPCM 00000003 00<br>wfd_3d_video_formats: none<br>wfd_content_protection: none<br>wfd_display_edid: none<br>wfd_coupled_sink: none<br>wfd_client_rtp_ports: RTP/AVP/UDP;unicast 1028 0 mode=play<br>wfd_audio_stream_control: 0 ～404 |

[Fig. 10]

EXAMPLE OF RTSP M110 REQUEST AND RTSP M110 RESPONSE

| Message ID | req/res (direction) | RTSP message |
|---|---|---|
| M110 | request (snk→src) | SET_PARAMETER rtsp://localhost/wfd1.0 RTSP/1.0<br>CSeq: i+3<br>Content-Type: text/parameters<br>Content-Length: 29<br><br>wfd_audio_stream_control: 4 ～405 |
| | response (src→snk) | RTSP/1.0 200 OK<br>CSeq: i+3 |

[Fig. 11]

EXAMPLE OF RTSP M110 REQUEST AND RTSP M110 RESPONSE

| Message ID | req/res (direction) | RTSP message |
|---|---|---|
| M110 | request (snk→src) | SET_PARAMETER rtsp://localhost/wfd1.0 RTSP/1.0<br>CSeq: i+3<br>Content-Type: text/parameters<br>Content-Length: 29<br><br>wfd_audio_stream_control: 8  ← 406 |
| | response (src→snk) | RTSP/1.0 200 OK<br>CSeq: i+3 |

[Fig. 13]
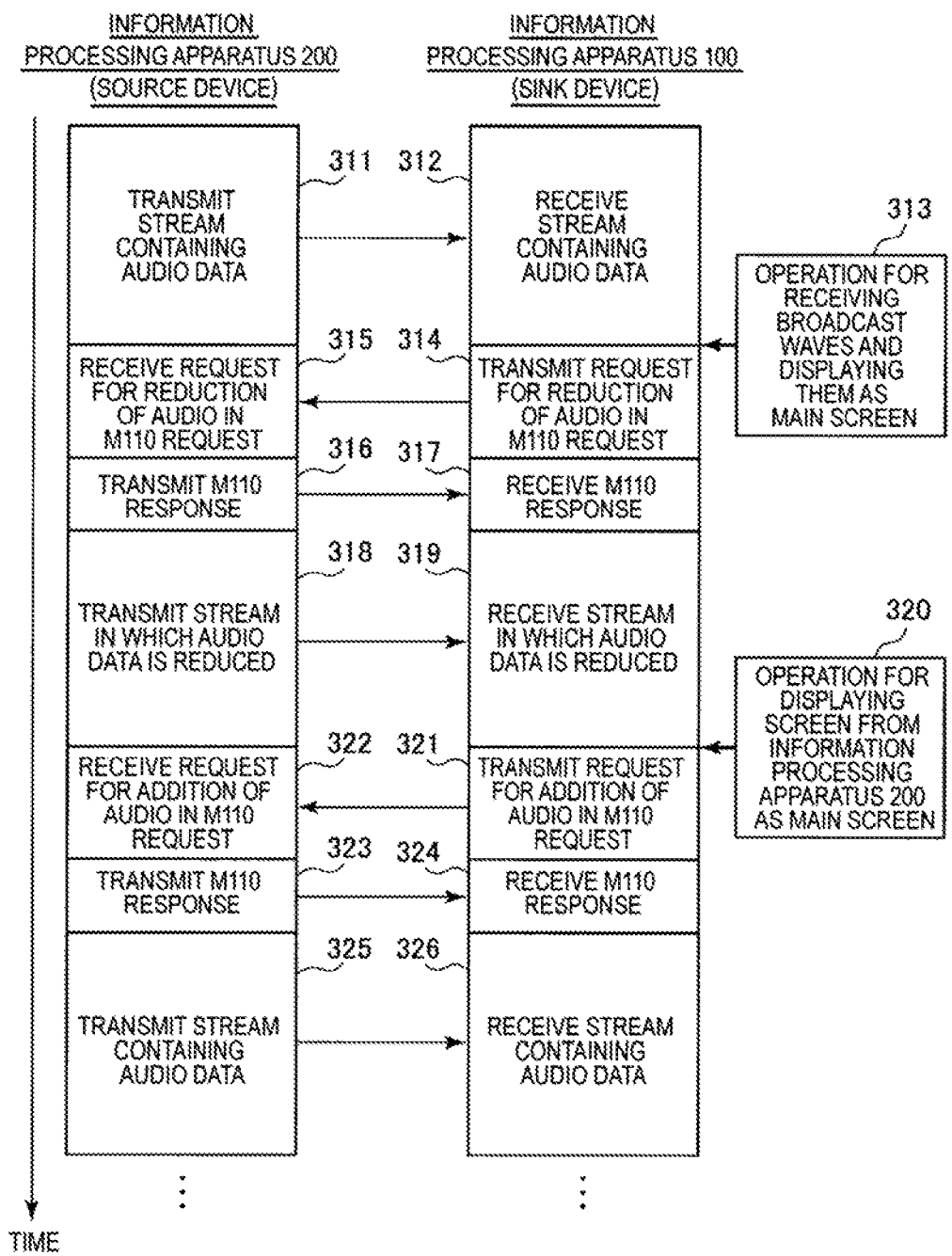

[Fig. 14]
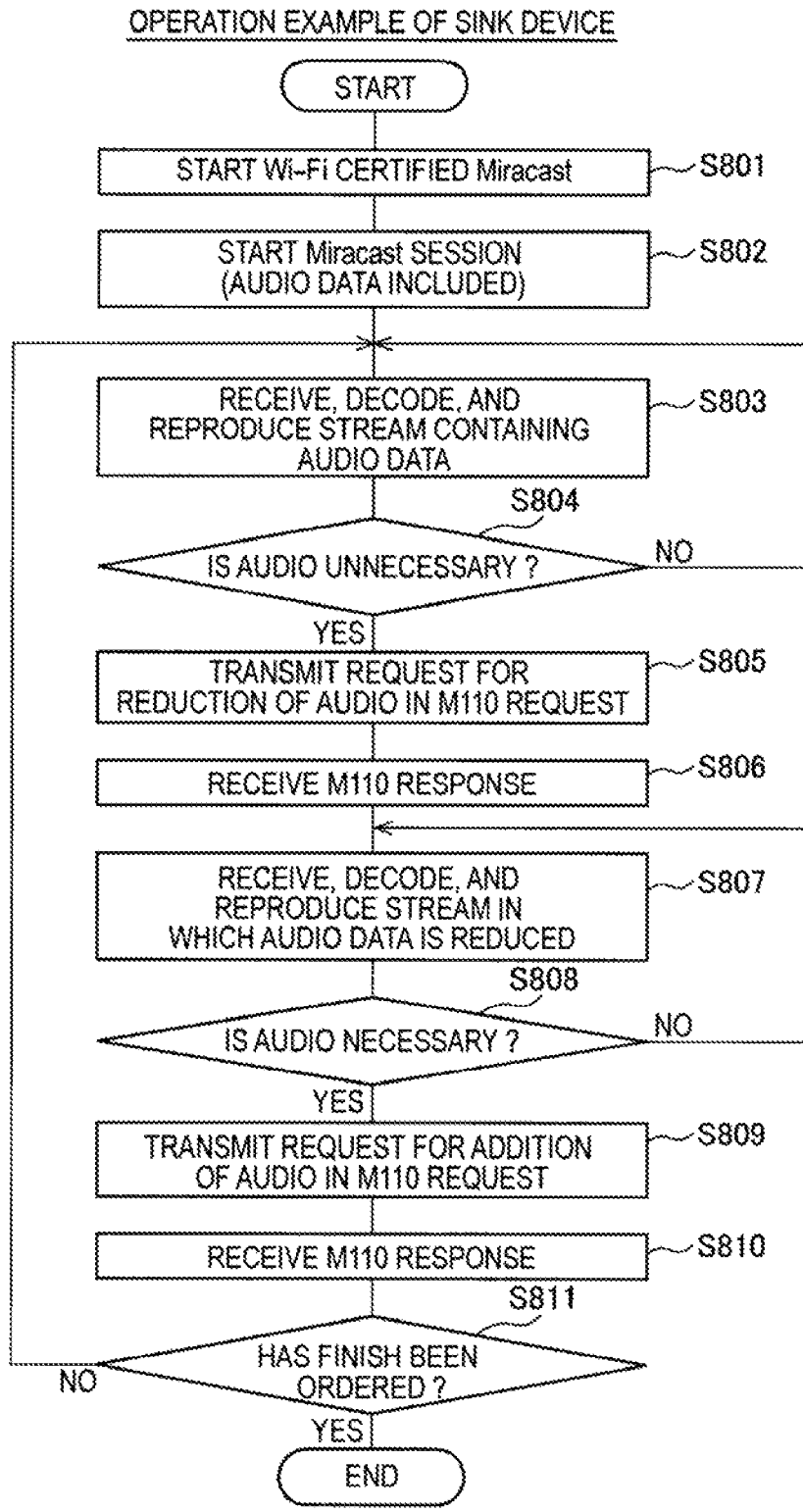

[Fig. 15]
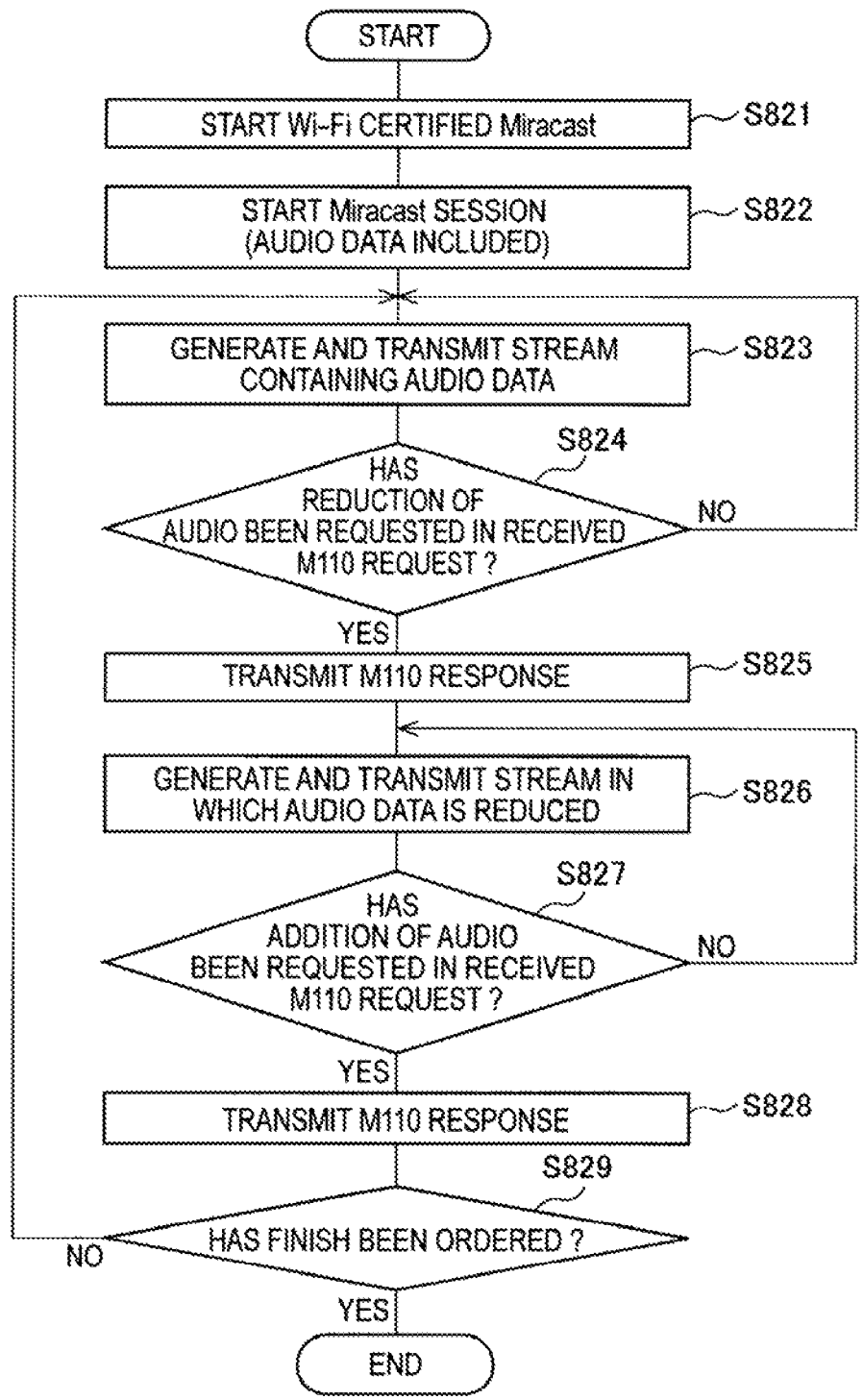

[Fig. 16]

| BIT POSITION | NAME | MEANING |
|---|---|---|
| B3 | (re-) include audio | AUDIO DATA IS TO BE (RE)INCLUDED |
| B2 | reduce audio | AUDIO DATA IS TO BE REDUCED |
| B1 | Reduce audio with alternate method | AUDIO DATA IS TO BE REDUCED BY ANOTHER METHOD |
| B0 | Initial audio-off | SPECIFY REDUCTION OF AUDIO DATA AT START OF STREAMING |

[Fig. 17]

EXAMPLE OF RTSP M3 REQUEST AND RTSP M3 RESPONSE

| Message ID | req/res (direction) | RTSP message |
|---|---|---|
| M3 | request (src→snk) | GET_PARAMETER rtsp://localhost/wfd1.0 RTSP/1.0<br>CSeq: i+1<br>Content-Type: text/parameters<br>Content-Length: 165 ～411<br><br>wfd_video_formats<br>wfd_audio_codecs<br>wfd_3d_video_formats<br>wfd_content_protection<br>wfd_display_edid<br>wfd_coupled_sink<br>wfd_client_rtp_ports<br>wfd_audio_stream_control ～412 |
| | response (snk→src) | RTSP/1.0 200 OK<br>CSeq: i+1<br>Content-Length: 317 ～413<br>Content-Type: text/parameters<br><br>wfd_video_formats: 00 00 01 01 00000001 00000000 00000000<br>                 00 0000 0000 00 none none<br>wfd_audio_codecs: LPCM 00000003 00<br>wfd_3d_video_formats: none<br>wfd_content_protection: none<br>wfd_display_edid: none<br>wfd_coupled_sink: none<br>wfd_client_rtp_ports: RTP/AVP/UDP;unicast 1028 0 mode=play<br>wfd_audio_stream_control: F ～414 |

[Fig. 18]

EXAMPLE OF RTSP M110 REQUEST AND RTSP M110 RESPONSE

| Message ID | req/res (direction) | RTSP message |
|---|---|---|
| M110 | request (snk→src) | SET_PARAMETER rtsp://localhost/wfd1.0 RTSP/1.0<br>CSeq: i+3<br>Content-Type: text/parameters<br>Content-Length: 29<br><br>wfd_audio_stream_control: 2 ～415 |
| | response (src→snk) | RTSP/1.0 200 OK<br>CSeq: i+3 |

[Fig. 20]
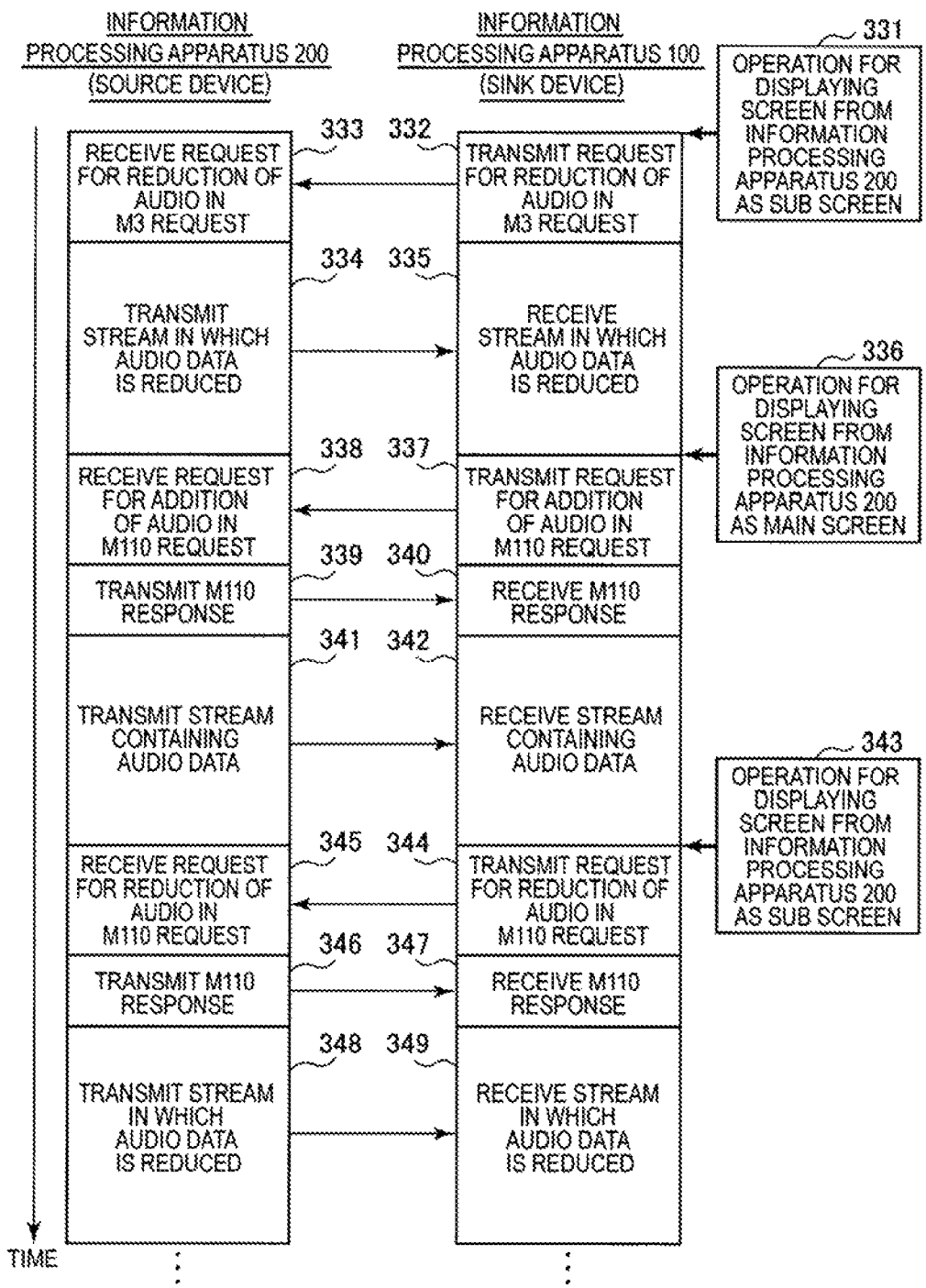

[Fig. 21]
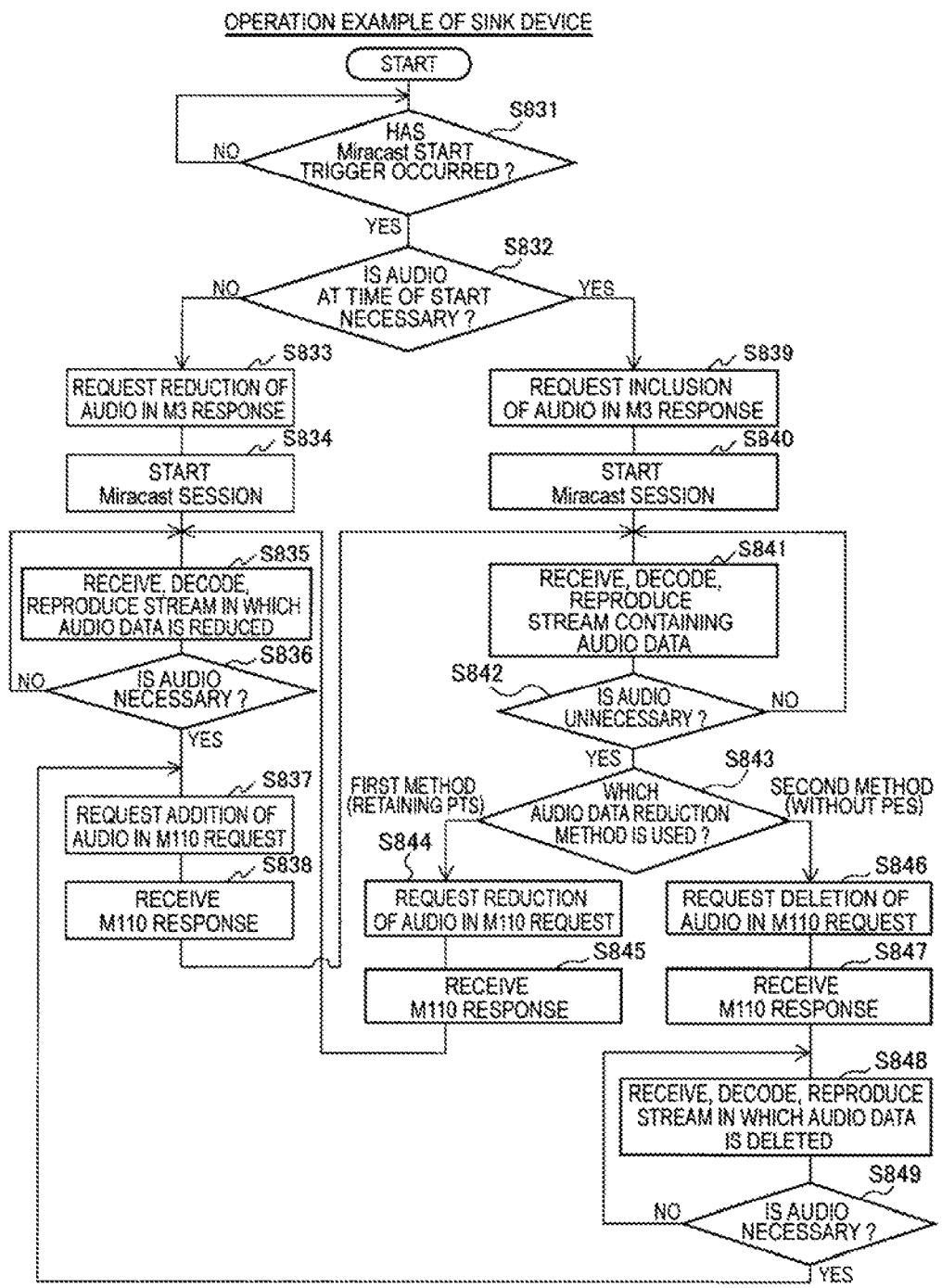

[Fig. 22]
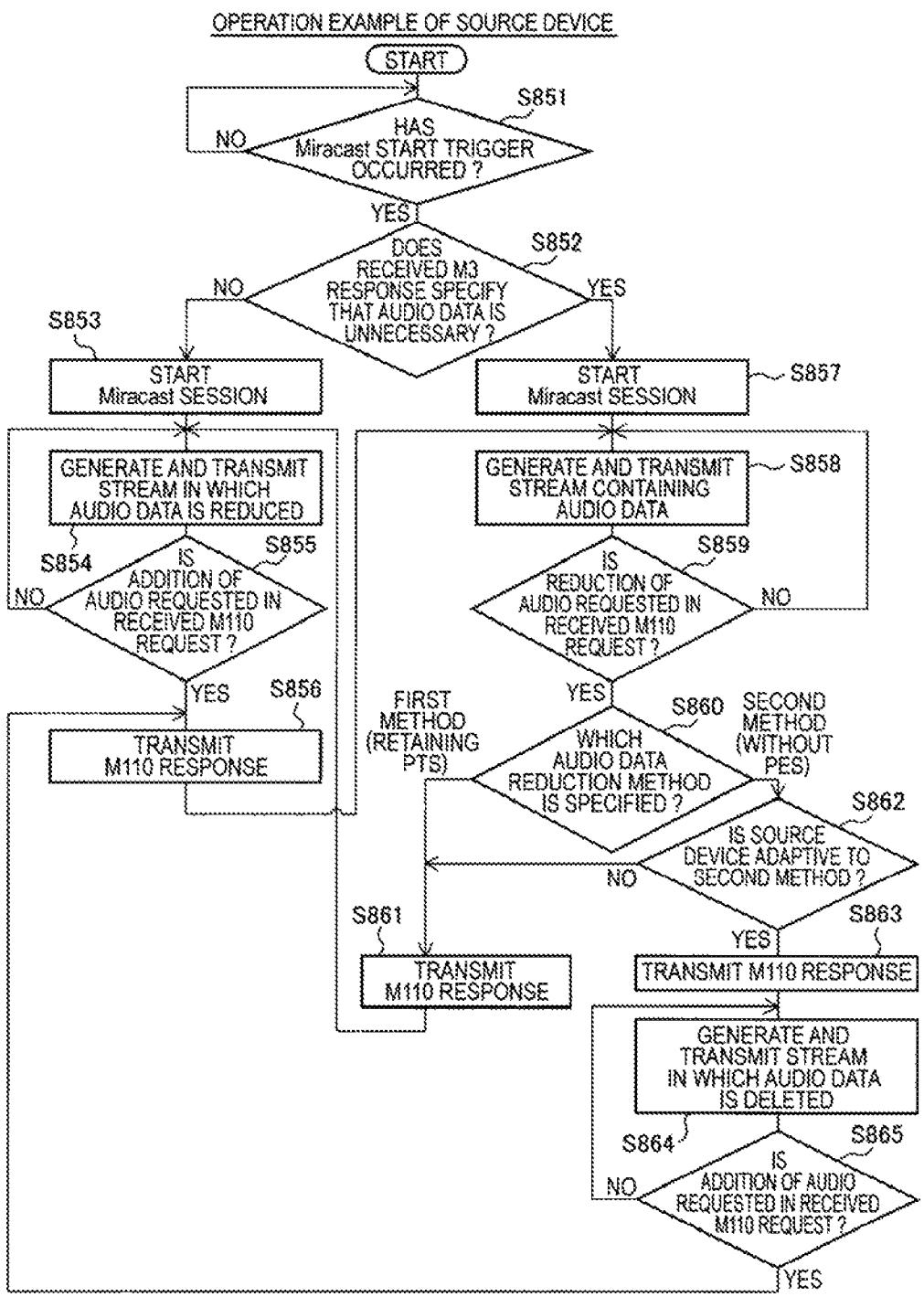

[Fig. 23]
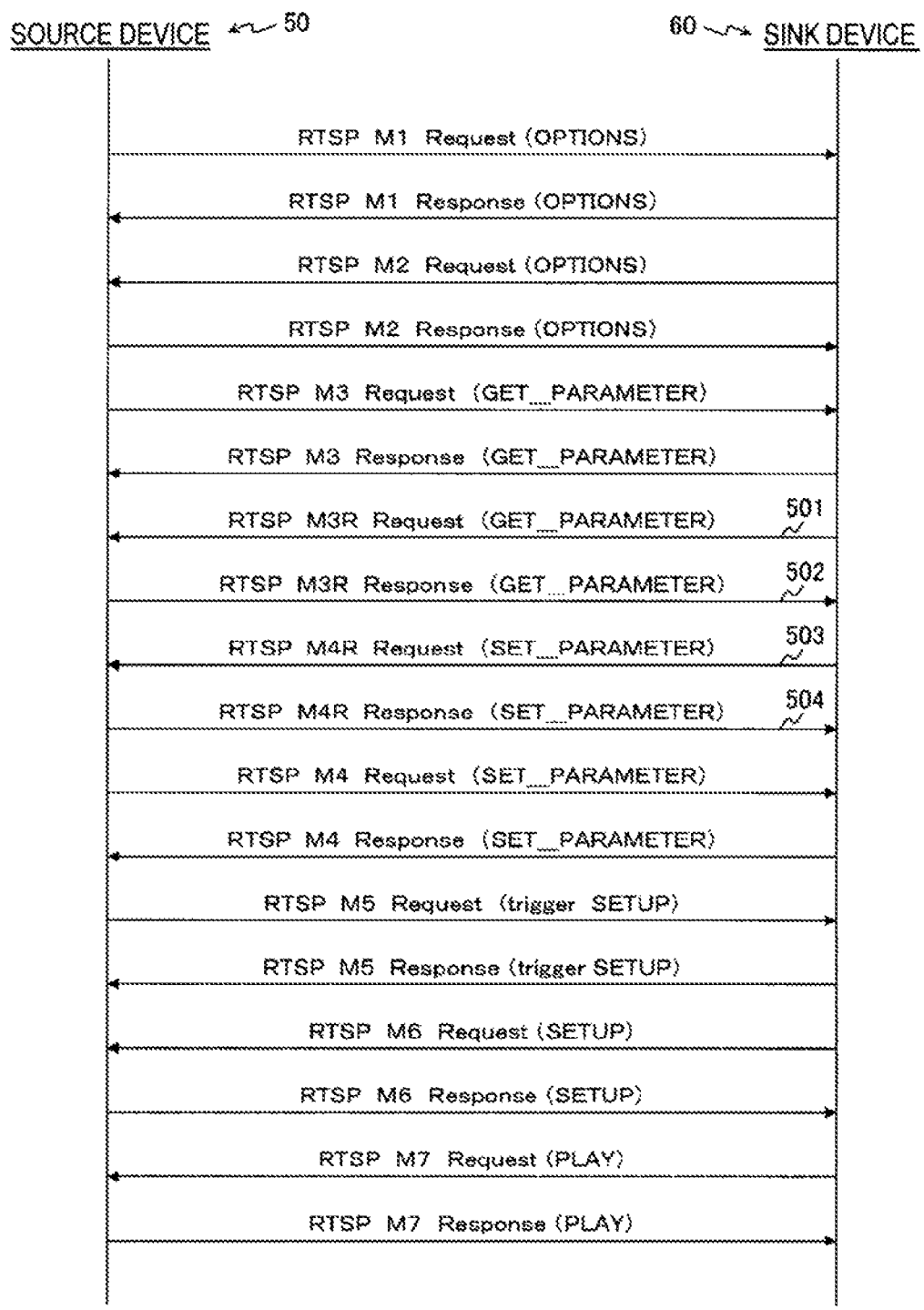

[Fig. 24]

| BIT POSITION | NAME | MEANING |
|---|---|---|
| B3 | (re-) include audio | AUDIO DATA IS TO BE (RE)INCLUDED |
| B2 | reduce audio | AUDIO DATA IS TO BE REDUCED |
| B1 | Reduce audio with alternate method | AUDIO DATA IS TO BE REDUCED BY ANOTHER METHOD |
| B0 | reserved | RESERVATION, SET TO "0" |

[Fig. 25]

EXAMPLE OF RTSP M3R REQUEST, RTSP M3R RESPONSE, RTSP M4R REQUEST, AND RTSP M4R RESPONSE

| Message ID | req/res (direction) | RTSP message |
|---|---|---|
| M3R | request (snk→src) | GET_PARAMETER rtsp://localhost/wfd1.0 RTSP/1.0<br>CSeq: j+1<br>Content-Type: text/parameters<br>Content-Length: 26<br><br>wfd_audio_stream_control ─── 420 |
| | response (src→snk) | RTSP/1.0 200 OK<br>CSeq: j+1<br>Content-Type: text/parameters<br>Content-Length: 29<br><br>wfd_audio_stream_control: E ─── 421 |
| M4R | request (snk→src) | SET_PARAMETER rtsp://localhost/wfd1.0 RTSP/1.0<br>CSeq: j+2<br>Content-Type: text/parameters<br>Content-Length: 29<br><br>wfd_audio_stream_control: 2 ─── 422 |
| | response (src→snk) | RTSP/1.0 200 OK<br>CSeq: j+2 |

[Fig. 26]

EXAMPLE OF RTSP M4 REQUEST AND RTSP M4 RESPONSE

| Message ID | req/res (direction) | RTSP message |
|---|---|---|
| M4 | request (src→snk) | SET_PARAMETER rtsp://localhost/wfd1.0 RTSP/1.0<br>CSeq: i+2<br>Content-Type: text/parameters<br>Content-Length: 266<br><br>wfd_video_formats: 00 00 01 01 00000001 00000000 00000000 00 0000 0000 00 none none<br>wfd_presentation_URL: rtsp://10.82.24.140/wfd1.0/streamid=0 none<br>wfd_client_rtp_ports: RTP/AVP/UDP;unicast 1028 0 mode=play |
| | response (snk→src) | RTSP/1.0 200 OK<br>CSeq: i+2 |

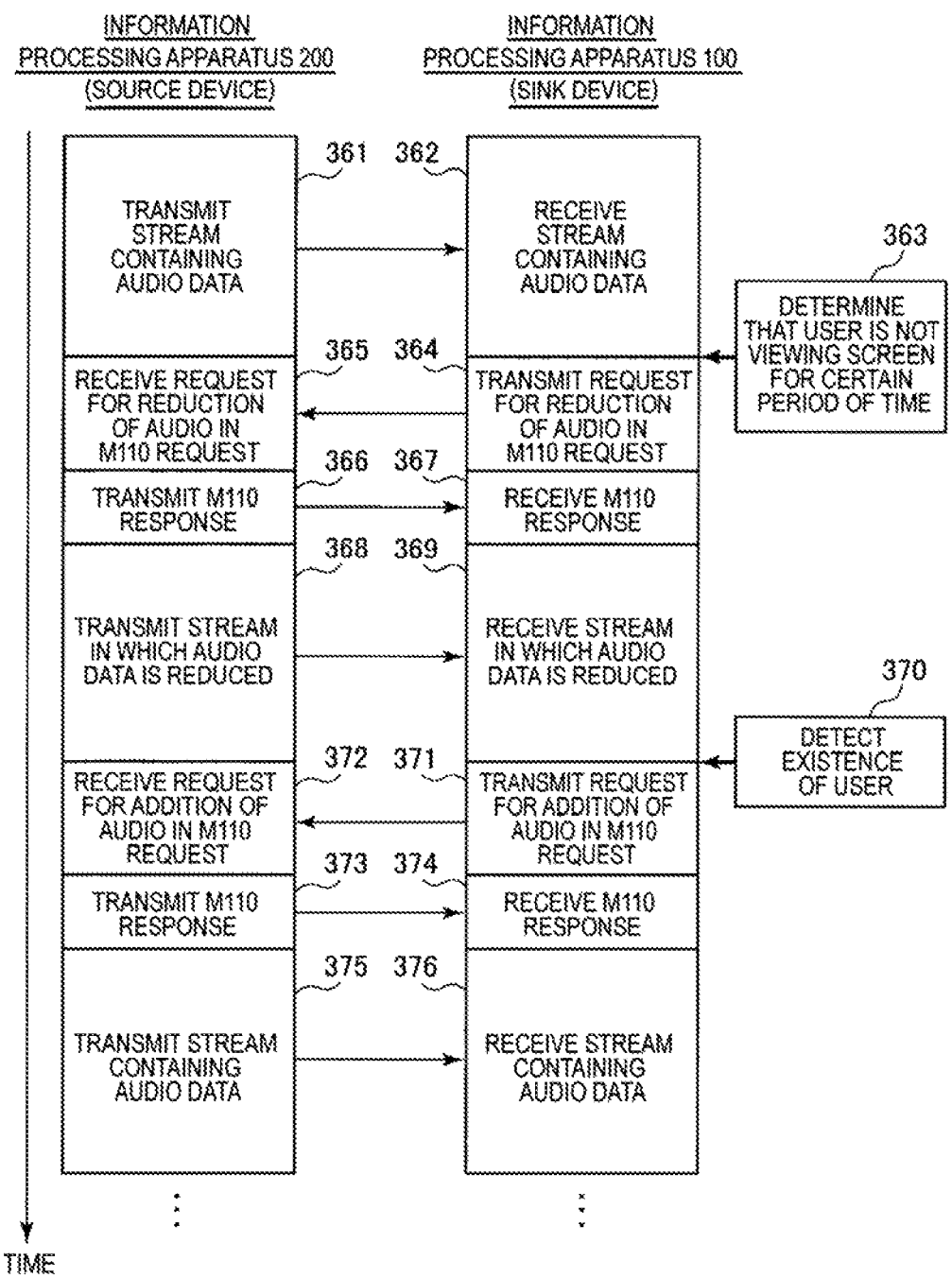
[Fig. 28]

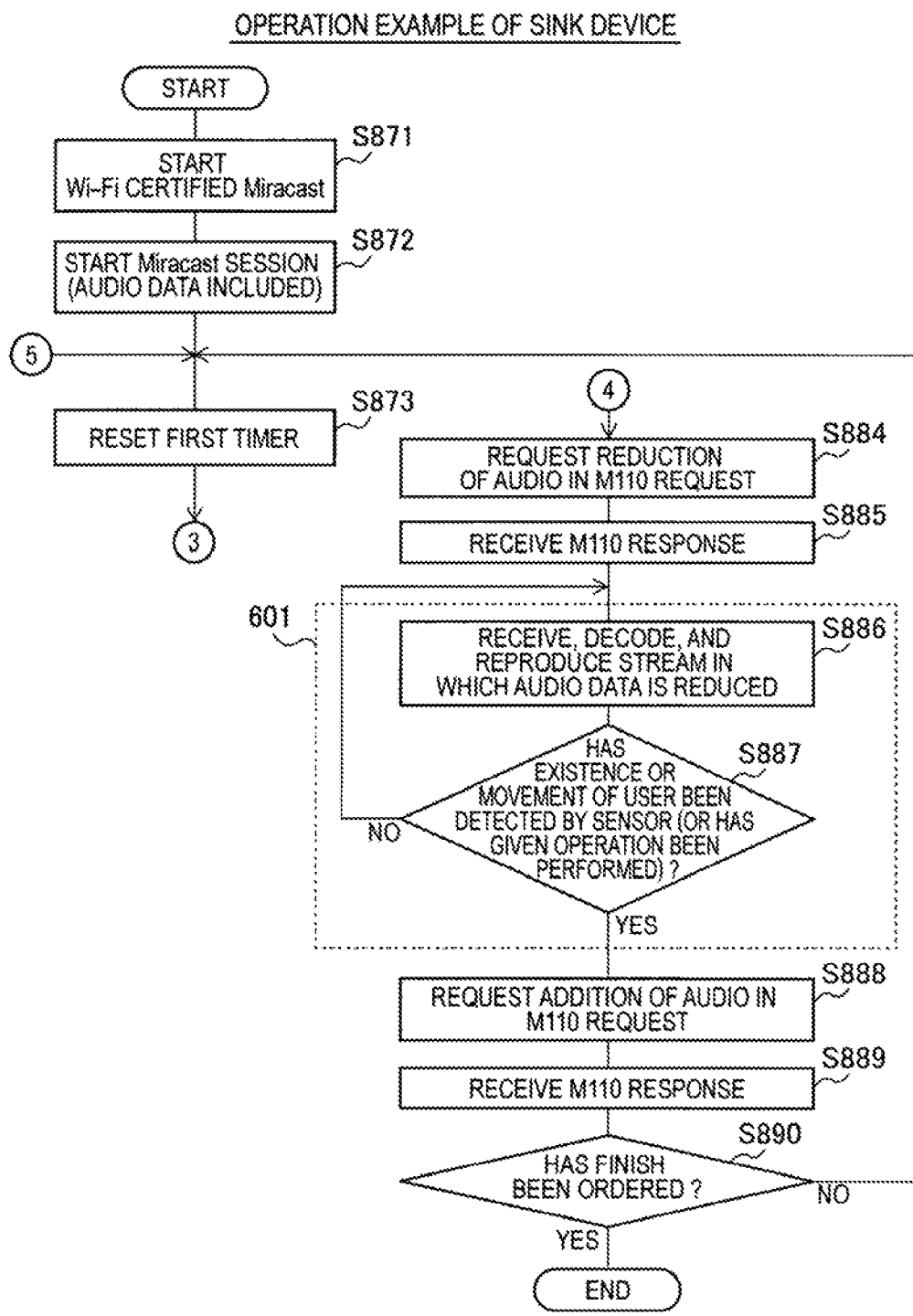

[Fig. 30]
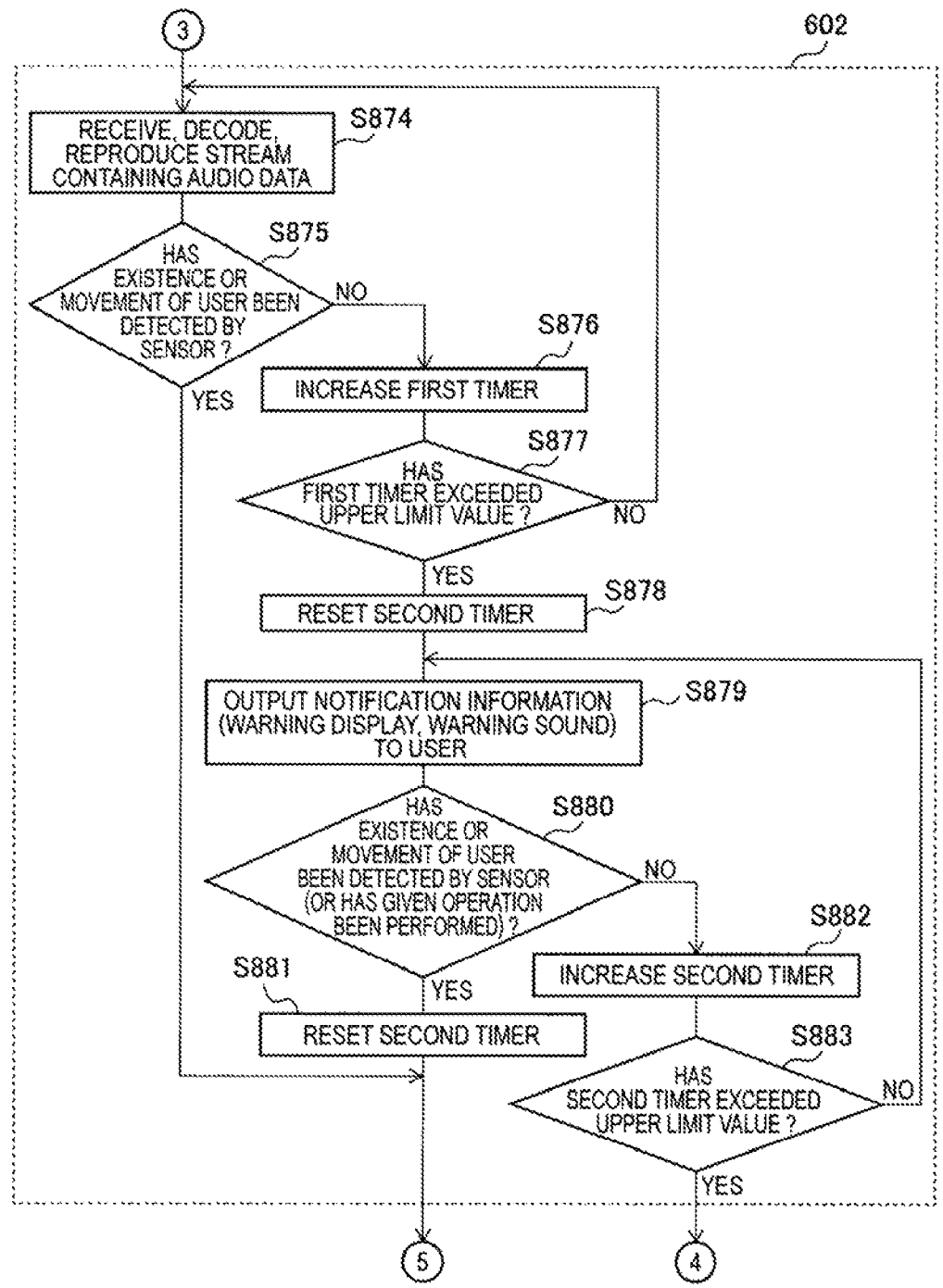

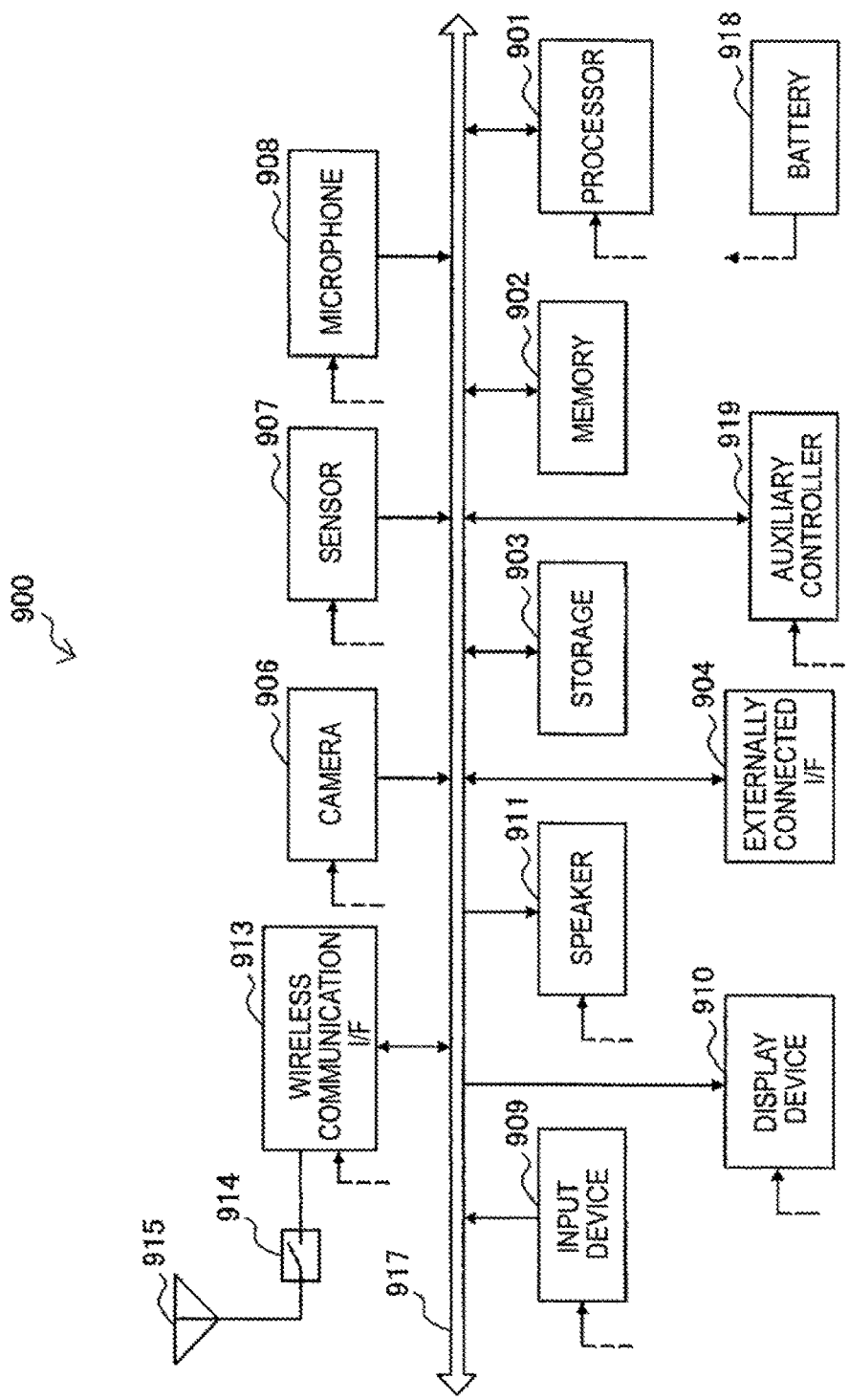

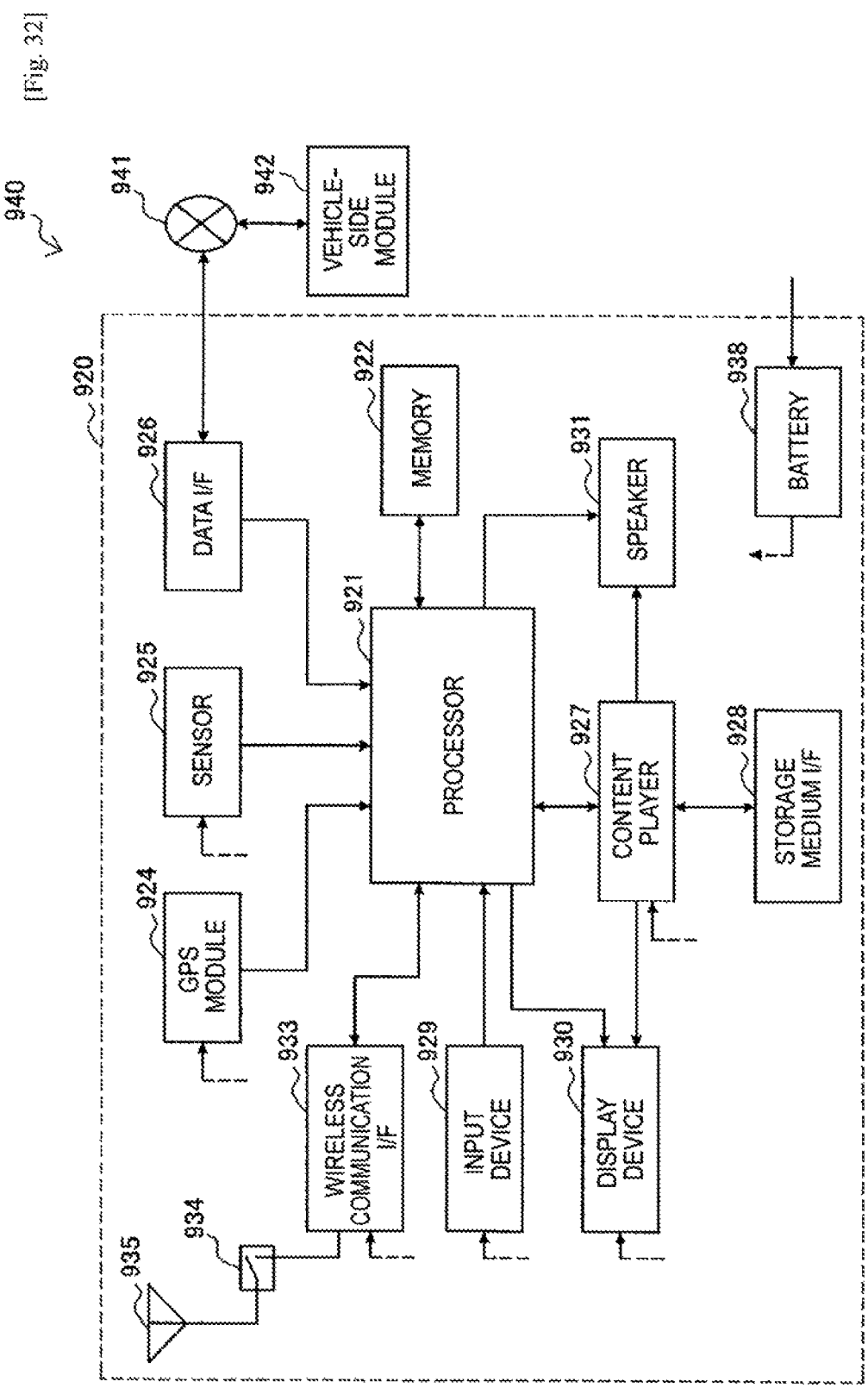

[Fig. 33]
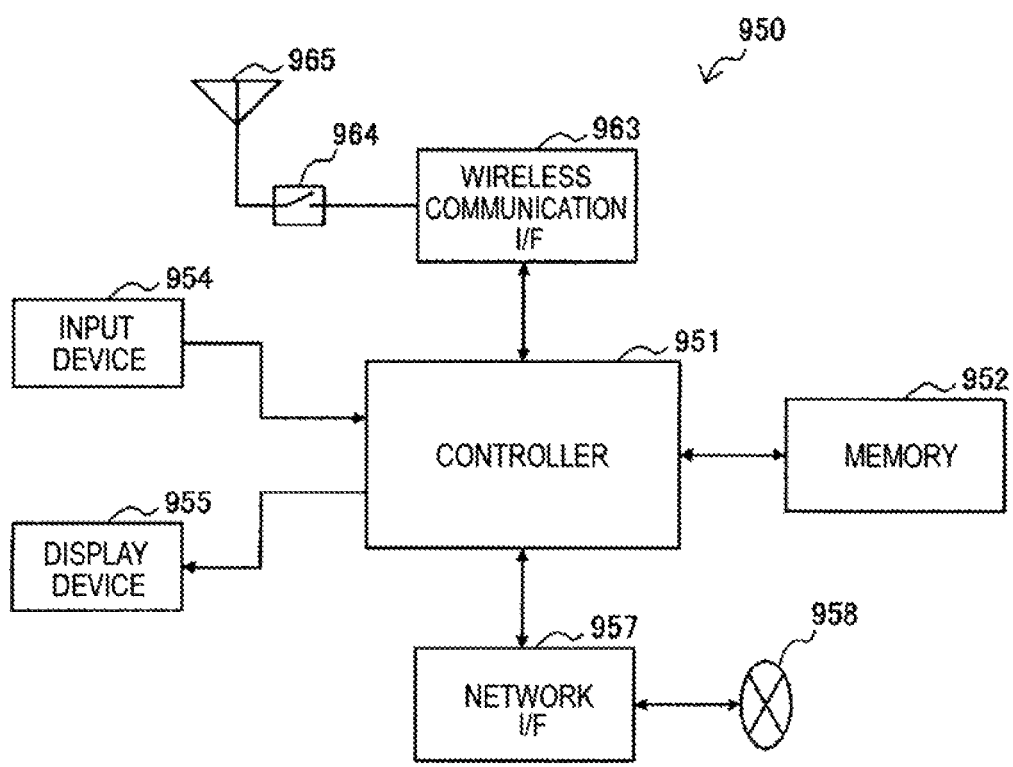

INFORMATION PROCESSING APPARATUS, COMMUNICATION SYSTEM, INFORMATION PROCESSING METHOD AND NON-TRANSITORY COMPUTER READABLE MEDIUM

CROSS REFERENCE TO RELATED APPLICATIONS

This application is a U.S. National Phase of International Patent Application No. PCT/JP2016/001133 filed on Mar. 2, 2016, which claims priority benefit of Japanese Patent Application No. JP 2015-049332 filed in the Japan Patent Office on Mar. 12, 2015. Each of the above-referenced applications is hereby incorporated herein by reference in its entirety.

TECHNICAL FIELD

The present disclosure relates to an information processing apparatus. To be more specific, the present disclosure relates to an information processing apparatus capable of exchanging information using wireless communication, a communication system, an information processing method, and a program causing a computer to execute the method.

BACKGROUND ART

In recent years, an information processing apparatuses performing wireless communication using a wireless local area network (LAN) has been used widely. As such a wireless LAN, a wireless LAN represented by institute of electrical and electronics engineers (IEEE) 802.11 has been used widely, for example.

Moreover, as wireless audio visual (AV) transmission communication, wireless fidelity (Wi-Fi) CERTIFIED Miracast has been proposed, for example (see PTL 1, for example).

CITATION LIST

Patent Literature

JP 2014-96074A

SUMMARY

Technical Problem

In the above-described related art, real-time image transmission can be performed between two information processing apparatuses in accordance with the specifications of Wi-Fi CERTIFIED Miracast. For example, an image based on image data transmitted from an information processing apparatus on the transmission side can be displayed on a display of an information processing apparatus on the reception side.

Here, it is assumed that a plurality of images with sound are displayed on the display of the information processing apparatus on the reception side. It is also assumed that with at least one image set to a main image and the rest set to sub images, only sound of the main image is output. In this case, the sound of images is handled differently depending on a display form of the images, and thus it is important to appropriately handle sound data exchanged between the apparatuses.

In view of the above-described circumstances, it is desirable to handle sound data appropriately.

Solution to Problem

A first embodiment of the present technology is directed to an information processing apparatus, an information processing method therefor, and a non-transitory computer readable medium storing program causing a computer to execute the method, the information processing apparatus including: circuitry configured to receive a multiplexed image signal and sound signal from another information processing apparatus using a moving picture experts group (MPEG) 2-transport stream (TS); and perform control to cause reduction of data contained in a packetized elementary stream (PES) payload in a PES packet packed in a transport (TS) packet specified by a packet identifier (PID) specifying sound data transmission described in a program map table (PMT) and to extract a presentation time stamp (PTS) contained in a PES header portion of the PES packet after requesting the another information processing apparatus to reduce a sound data amount In the first embodiment, the controller may make the request to the another information processing apparatus based on a first trigger. In this manner, an embodiment of the present disclosure exerts an effect of making a request to another information processing apparatus based on the first trigger.

In the first embodiment, the controller may specify, when making the request to the another information processing apparatus, one of the first sound data reduction method in which the MPEG2-TS multiplex signal containing the PES packet carrying sound data is generated and transmitted and a second sound data reduction method in which the MPEG2-TS multiplex signal not containing the PES packet carrying sound data is generated and transmitted. In this manner, an embodiment of the present disclosure exerts an effect of specifying, when making a request to another information processing apparatus, one of the first sound data reduction method in which an MPEG2-TS multiplex signal containing a PES packet carrying sound data is generated and transmitted and the second sound data reduction method in which an MPEG2-TS multiplex signal not containing a PES packet carrying sound data is generated and transmitted.

In the first embodiment, the controller may perform control to extract sound data contained in the PES payload when requesting the another information processing apparatus to restore an original sound data amount based on a second trigger while receiving the MPEG2-TS multiplex signal in which the sound data amount is reduced and performing demultiplexing on the MPEG2-TS multiplex signal received from the another information processing apparatus after the request. In this manner, an embodiment of the present disclosure exerts an effect of extracting sound data contained in a PES payload when requesting another information processing apparatus to restore an original sound data amount based on the second trigger while receiving an MPEG2-TS multiplex signal in which a sound data amount is reduced and performing demultiplexing on an MPEG2-TS multiplex signal received from another information processing apparatus after the request.

In the first embodiment, the first trigger and the second trigger may be caused by user operation. In this manner, an embodiment of the present disclosure exerts an effect of using the first trigger and the second trigger caused by user operation.

In the first embodiment, the first trigger may be caused by detection of a user exiting around the information processing apparatus or movement of the user. In this manner, an embodiment of the present disclosure exerts an effect of using the first trigger caused by detection of a user existing around an information processing apparatus or the movement of the user.

In the first embodiment, the controller may retain a sound volume setting value of sound output before the request is made, requests the another information processing apparatus to restore an original sound data amount, and sets the retained sound volume setting value at timing when sound data contained in the PES payload is extracted after the request. In this manner, an embodiment of the present disclosure exerts an effect of retaining a sound volume setting value of sound output before a request is made, requesting another information processing apparatus to restore an original sound data amount, and setting the retained sound volume setting value at timing when sound data contained in a PES payload is extracted after the request.

A second embodiment of the present technology is directed to an information processing apparatus, an information processing method therefor, and a non-transitory computer readable medium storing program causing a computer to execute the method, the information processing apparatus including: circuitry configured to transmit a multiplexed image signal and sound signal to another information processing apparatus using a moving picture experts group (MPEG) 2-transport stream (TS); and perform control to reduce a packetized elementary stream (PES) payload data amount in a PES packet stored in a TS packet specified by a packet identifier (PID) specifying sound data transmission described in a program map table (PMT), based on a request from the another information processing apparatus, without changing the PID and to multiplex and transmit the PES packet for sound signal transmission in which the data amount is reduced and the PES packet for image signal transmission.

In the second embodiment, the controller may perform control to reduce a data amount, when requested to reduce a sound data amount from the another information processing apparatus, by making the PES payload data amount to substantially zero or completely zero. In this manner, an embodiment of the present disclosure exerts an effect of reducing a data amount, when requested to reduce a sound data amount from another information processing apparatus, by making a PES payload data amount to substantially zero or completely zero.

In the second embodiment, the controller may perform control to store, when requested to restore an original sound data amount from the another information processing apparatus while transmitting the PES packet for sound signal transmission in which the data amount is reduced by the first sound data reduction and the PES packet for image signal transmission after multiplexing, normal sound data in the PES payload, and to multiplex and transmit the PES packet for sound signal transmission and the PES packet for image signal transmission. In this manner, an embodiment of the present disclosure exerts an effect of storing, when requested to restore an original sound data amount from another information processing apparatus while transmitting a PES packet for sound signal transmission in which the data amount is reduced by the first sound data reduction and a PES packet for image signal transmission after multiplexing them, normal sound data in a PES payload, and multiplexing and transmitting the PES packet for sound signal transmission and the PES packet for image signal transmission.

In the second embodiment, the controller may perform control to perform, when requested to use sound data reduction other than the first sound data reduction to reduce a sound data amount from the another information processing apparatus, second sound data reduction in which the PES packet carrying sound data is not generated without including information of the PID specifying sound data in the PMT, and to transmit a PES packet for image signal transmission without multiplexing a PES packet for sound signal transmission. In this manner, an embodiment of the present disclosure exerts an effect of performing, when requested to use sound data reduction other than the first sound data reduction to reduce a sound data amount from another information processing apparatus, the second sound data reduction in which a PES packet carrying sound data is not generated without including information of a PID specifying sound data in a PMT, and transmitting a PES packet for image signal transmission without multiplexing a PES packet for sound signal transmission.

In the second embodiment, the controller may perform control to store, when requested to restore an original sound data amount from the another information processing apparatus while transmitting the PES packet for image signal transmission without multiplexing the PES packet for sound signal transmission after the second sound data reduction is performed, normal sound data in the PES payload with the PID specifying sound data transmission included in the PMT, and to multiplex and transmit the PES packet for sound signal transmission and the PES packet for image signal transmission. In this manner, an embodiment of the present disclosure exerts an effect of storing, when requested to restore an original sound data amount from another information processing apparatus while transmitting a PES packet for image signal transmission without multiplexing a PES packet for sound signal transmission after the second sound data reduction is performed, normal sound data in a PES payload with a PID specifying sound data transmission included in a PMT, and multiplexing and transmitting a PES packet for sound signal transmission and a PES packet for image signal transmission.

A third embodiment of the present technology is a communication system, an information processing method therefor, and a program causing a computer to execute the method, the communication system including: a first information processing apparatus configured to wirelessly transmit a multiplexed image signal and sound signal to a second information processing apparatus using an MPEG2-TS, reduce a PES payload data amount in a PES packet stored in a TS packet specified by a PID specifying sound data transmission described in a PMT, based on a request from the second information processing apparatus, without changing the PID, to perform first sound data reduction in which a PES packet containing a PTS in a PES header portion is generated, and to multiplex and transmit the PES packet for sound signal transmission in which the data amount is reduced and the PES packet for image signal transmission; and a second information processing apparatus configured to discard data contained in the PES payload in the PES packet stored in the TS packet specified by the PID specifying sound data transmission described in the PMT and to extract the PTS contained in the PES header portion, when requesting the first information processing apparatus to reduce a sound data amount while receiving the multiplexed image signal and sound signal from the first information processing apparatus using the MPEG2-TS and performing demultiplexing on an MPEG2-TS multiplex signal received from the first information processing apparatus after the request. In this manner, an embodiment of the present disclosure exerts an effect that the first information processing apparatus reduces a PES payload data amount in a PES packet stored in a TS packet specified by a PID specifying sound data transmission described in a PMT, based on a request from the second information processing apparatus, without changing the PID, performs the first sound data reduction in which a PES packet containing a PTS in a PES header portion is generated, and multiplexes and transmits a PES packet for sound signal transmission in which the data amount is reduced and a PES packet for image signal transmission, and the second information processing apparatus discards data contained in a PES payload in a PES packet stored in a TS packet specified by a PID specifying sound data transmission described in a PMT and extracts a PTS contained in a PES header portion, when requesting the first information processing apparatus to reduce a sound data amount and performing demultiplexing on an MPEG2-TS multiplex signal received from the first information processing apparatus after the request.

Advantageous Effects of Invention

An embodiment of the present disclosure exerts an excellent effect of handling sound data appropriately. The effect described herein is not necessarily restrictive, and any of the effects described in the present disclosure may be exerted.

BRIEF DESCRIPTION OF DRAWINGS

FIG. 1 is a diagram illustrating a configuration example of a communication system 10 according to the first embodiment of the present disclosure.

FIG. 2 is a block diagram illustrating a functional configuration example of an information processing apparatus 100 according to an embodiment of the present disclosure.

FIG. 3 is a sequence chart illustrating a communication processing example of a source device 50 and a sink device 60 that are bases of an embodiment of the present disclosure.

FIG. 4 is a sequence chart illustrating a communication processing example of a source device 50 and a sink device 60 that are bases of an embodiment of the present disclosure.

FIG. 5 is a sequence chart illustrating a communication processing example of a source device 50 and a sink device 60 that are bases of an embodiment of the present disclosure.

FIG. 6 is a diagram illustrating an example of an RTSP message exchanged between the source device 50 and the sink device 60 that are bases of an embodiment of the present disclosure.

FIG. 7 is a diagram illustrating an example of an RTSP message exchanged between the source device 50 and the sink device 60 that are bases of an embodiment of the present disclosure.

FIG. 8 is a diagram illustrating an example of information exchanged between information processing apparatuses according to the first embodiment of the present disclosure.

FIG. 9 is a diagram illustrating an example of information exchanged between information processing apparatuses according to the first embodiment of the present disclosure.

FIG. 10 is a diagram illustrating an example of information exchanged between information processing apparatuses according to the first embodiment of the present disclosure.

FIG. 11 is a diagram illustrating an example of information exchanged between information processing apparatuses according to the first embodiment of the present disclosure.

FIG. 13 is a diagram illustrating a shift example of information exchanged between the information processing apparatus 100 and an information processing apparatus 200 according to the first embodiment of the present disclosure.

FIG. 14 is a flowchart illustrating an example of processing procedures of reception processing by the information processing apparatus 100 according to the first embodiment of the present disclosure.

FIG. 15 is a flowchart illustrating an example of processing procedures of transmission processing by the information processing apparatus 200 according to the first embodiment of the present disclosure.

FIG. 16 is a diagram illustrating an example of information exchanged between information processing apparatuses according to the second embodiment of the present disclosure.

FIG. 17 is a diagram illustrating an example of information exchanged between information processing apparatuses according to the second embodiment of the present disclosure.

FIG. 18 is a diagram illustrating an example of information exchanged between information processing apparatuses according to the second embodiment of the present disclosure.

FIG. 20 is a diagram illustrating a shift example of information exchanged between the information processing apparatus 100 and the information processing apparatus 200 according to the second embodiment of the present disclosure.

FIG. 21 is a flowchart illustrating an example of processing procedures of reception processing by the information processing apparatus 100 according to the second embodiment of the present disclosure.

FIG. 22 is a flowchart illustrating an example of processing procedures of transmission processing by the information processing apparatus 200 according to the second embodiment of the present disclosure.

FIG. 23 is a sequence chart illustrating a communication processing example of the source device 50 and the sink device 60 according to the second embodiment of the present disclosure.

FIG. 24 is a diagram illustrating an example of information exchanged between the information processing apparatuses according to the second embodiment of the present disclosure.

FIG. 25 is a diagram illustrating an example of information exchanged between the information processing apparatuses according to the second embodiment of the present disclosure.

FIG. 26 is a diagram illustrating an example of information exchanged between the information processing apparatuses according to the second embodiment of the present disclosure.

FIG. 28 is a diagram illustrating a shift example of information exchanged between the information processing apparatus 100 and the information processing apparatus 200 according to the third embodiment of the present disclosure.

FIG. 29 is a flowchart illustrating an example of processing procedures of reception processing by the information processing apparatus 100 according to the third embodiment of the present disclosure.

FIG. 30 is a flowchart illustrating an example of processing procedures of reception processing by the information processing apparatus 100 according to the third embodiment of the present disclosure.

FIG. 31 is a block diagram illustrating an example of a schematic configuration of a smartphone.

FIG. 32 is a block diagram illustrating an example of a schematic configuration of a car navigation device.

FIG. 33 is a block diagram illustrating an example of a schematic configuration of a wireless access point.

DESCRIPTION OF EMBODIMENTS

Figure 12A:
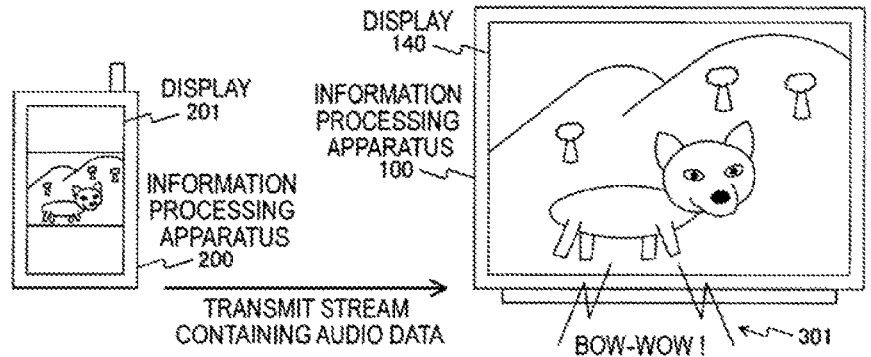
FIGS. 12A, 12B and 12C are diagrams illustrating a shift example of a screen displayed on a display 140 and sound information output from a sound output unit 150 in the information processing apparatus 100 according to the first embodiment of the present disclosure.

Hereinafter, preferred embodiments of the present disclosure (hereinafter, referred to as embodiments) will be described. The description is given in the following order.

1. First embodiment (example in which the reduction of audio data is requested during streaming)
2. Second embodiment (example in which the audio data is reduced at the start of streaming, example in which the use of the second sound data reduction method is requested)
3. Third embodiment (example in which a sink device detects the movement or existence of a person and requests reduction of audio data based on the detection result)
4. Application example 1. First Embodiment "Configuration Example of Communication System"

FIG. 1 is a diagram illustrating a configuration example of the communication system 10 according to the first embodiment of the present disclosure.

The communication system 10 includes the information processing apparatus 100, the information processing apparatus 200, and an information processing apparatus 210.

The information processing apparatus 100, the information processing apparatus 200, and the information processing apparatus 210 have a wireless communication function, and are information processing apparatuses capable of transmitting and receiving various kinds of information by connecting one another using wireless communication. Moreover, these information processing apparatuses are information processing apparatuses supporting the specifications of IEEE 802.11 enabling peer to peer (P2P) connection. That is, these information processing apparatuses form a communication group and can directly communicate one another without any access point interposed. In this case, an information processing apparatus functioning as a group owner and an information processing apparatus functioning as a client may be or may not be determined during manufacturing. When they are not determined during manufacturing, an information processing apparatus functioning as a group owner and an information processing apparatus functioning as a client can be determined through negotiation among a plurality of information processing apparatuses. For example, when the information processing apparatus 100 and the information processing apparatus 200 form a communication group, the information processing apparatus 100 can directly transmit data (e.g., moving image contents) to the information processing apparatus 200. In this case, the information processing apparatuses 100 and 200 connect to each other using wireless communication, and moving image contents stored in the information processing apparatus 100 can be displayed on the information processing apparatus 200. Note that Wi-Fi Direct is known as an example of the communication standard for direct communication between information processing apparatuses.

The information processing apparatus 100 is an image viewing device (e.g., a television receiver with a built-in hard disk) recording or displaying moving image contents, for example. For example, the information processing apparatus 100 can receive broadcast waves from a broadcasting station 11 and display an image 21 based on the broadcast waves on the display 140. Moreover, the information processing apparatus 100 can display an image 22 based on image contents transmitted from the information processing apparatus 200 on the display 140, for example. The information processing apparatus 100 can also display an image 23 based on image contents transmitted from the information processing apparatus 210 on the display 140, for example.

The information processing apparatus 200 is a portable information processing apparatus (e.g., a smartphone having a call function and a data communication function), for example. The information processing apparatus 210 is an information processing apparatus performing various kinds of information processing (e.g., a tablet terminal, a notebook-type personal computer (PC)), for example.

Note that the information processing apparatus 100, the information processing apparatus 200, and the information processing apparatus 210 can transmit and receive various kinds of information by connecting to an access point (not illustrated) using wireless communication. Here, the access point is an access point supporting wireless LAN standards of IEEE 802.11a, 11b, 11g, and 11n, for example. That is, a router and the access point (e.g., a product in which an access point is embedded in a router) achieve a wireless LAN standardized by IEEE 802.11a, 11b, 11g, and 11n.

Note that the information processing apparatuses illustrated in FIG. 1 is an example, and the embodiment can be also applied to another information processing apparatus. The embodiment can be applied to an imaging device having a wireless communication function (e.g., a digital steal camera, a digital video camera (e.g., a camera integrated type recorder)) and a sound output device with a display having a wireless communication function (e.g., a portable music player with a display panel), for example. The embodiment can be also applied to a display device having a wireless communication function (e.g., a digital photo frame), and an electronic book display device having a wireless communication function, for example. Moreover, the embodiment can be applied to another information processing apparatus having a wireless communication function, for example. The information processing apparatus having a wireless communication function includes an image processing device for domestic use (a digital versatile disc (DVD) recorder, a video deck, etc.), personal digital assistants (FDA), a home game machine, a home electric appliance, a portable image processing device, a portable game machine, and the like, for example. The embodiment can be also applied to an information processing apparatus capable of performing wireless communication by providing wireless communication equipment having a wireless communication function thereto (e.g., a personal computer not having a wireless communication function), for example.

"Configuration Example of Information Processing Apparatus"

FIG. 2 is a block diagram illustrating a functional configuration example of the information processing apparatus 100 according to an embodiment of the present disclosure. Note that the functional configurations of the information processing apparatus 200 and the information processing apparatus 210 are substantially same as the functional configuration of the information processing apparatus 100, and thus the explanation thereof is omitted here.

The information processing apparatus 100 includes an communication unit 110, an antenna 114, a sensor 120, an operation reception unit 130, the display 140, the sound output unit 150, a memory 160, and a controller 170. The communication unit 110 includes a data processing unit 111, a transmission processing unit 112, and a wireless interface unit 113.

The data processing unit 111 processes various kinds of data based on the control of the controller 170. For example, in transmission operation, the data processing unit 111 forms various data frames and data packets in accordance with a request from an upper layer and supplies them to the transmission processing unit 112. For example, in reception operation, the data processing unit 111 processes and analyzes various data frames and data packets supplied from the transmission processing unit 112.

The transmission processing unit 112 performs various kinds of transmission processing based on the control of the controller 170. For example, in transmission operation, the transmission processing unit 112 performs processing of adding error detection codes for various data headers, frame check sequences (FCS), and the like, into packets generated by the data processing unit 111, for example. Then, the transmission processing unit 112 supplies the processed data to the wireless interface unit 113. For example, in reception operation, the transmission processing unit 112 analyzes headers added to various data frames supplied from the wireless interface unit 113. Then, once the transmission processing unit 112 confirms that the data frames do not have any error based on the error detection codes, it supplies the various data frames to the data processing unit 111.

The wireless interface unit 113 is an interface for transmitting and receiving various kinds of information by connecting to another information processing apparatus. For example, in transmission operation, the wireless interface unit 113 generates a modulated signal in a frequency band of a carrier based on data received from the transmission processing unit 112, and transmits the generated modulated signal as a wireless signal through the antenna 114. Moreover, in reception operation, the wireless interface unit 113 down-converts a wireless signal received by the antenna 114 into a bit string, thereby decoding various data frames.

Moreover, the communication unit 110 receives a multiplexed image signal and sound signal from another information processing apparatus using a moving picture experts group (MPEG) 2-transport stream (TS), for example. The communication unit 110 wirelessly transmits a multiplexed image signal and sound signal to another information processing apparatus using the MPEG2-TS.

The sensor 120 is a sensor detecting the existence of a person, the movement or a gesture of a person (e.g., action of a person waving a hand, or action of a person performing some operation), and the like, and supplies the detected information to the controller 170. Here, as the sensor 120, there can be used an image sensor imaging a subject, generating image data, and performing various kinds of image recognition regarding the image data, for example. As the sensor 120, an infrared sensor acquiring various kinds of information using infrared can be used, for example. Moreover, as the sensor 120, a human sensor detecting the existence of a person (e.g., a person approaching the information processing apparatus 100) using infrared, ultrasonic waves, visible light, and the like, can be used. One of these sensors may be used as the sensor 120, or a plurality of them may be combined and used as the sensor 120. Another sensor may be also used.

The operation reception unit 130 is an operation reception unit receiving an operation input by a user, and outputs operation information in accordance with the received operation input to the controller 170. As the operation reception unit 130, there can be used a mouse, a keyboard, a touch panel, a button, a microphone, a switch, or a lever, for example. The operation reception unit 130 also receives operation for transmitting and receiving various kinds of data to and from another information processing apparatus.

The display 140 is a display displaying various kinds of information (image information, character information, time information, and the like) based on the control of the controller 170. The display 140 displays an image transmitted from another information processing apparatus (e.g., image illustrated in FIG. 1), for example. Note that as the display 140, a display panel such as an organic electro luminescence (EL) panel and a liquid crystal display (LCD) panel can be used, for example. Note that the operation reception unit 130 and the display 140 can be constituted integrally using a touch panel enabling a user to perform operation input thereto by bringing the finger onto or close to a display surface.

The sound output unit 150 is a sound output unit (e.g., a speaker) outputting various kinds of sound information based on the control of the controller 170.

The memory 160 functions as a working area for data processing by the controller 170 and as a storage medium storing various kinds of data. The memory 160 stores various kinds of information contained in data to be transmitted to an information processing apparatus as a connection partner. As the memory 160, a recording medium such as a nonvolatile memory, a magnetic disk, an optical disk, and a magneto optical (MO) disk can be used, for example. Note that as a nonvolatile memory, an electrically erasable programmable read-only memory (EEPROM) or an erasable programmable ROM (EPROM) can be used, for example. As a magnetic disc, a hard disk or a disk-type magnetic disk can be used, for example. As an optical disk, a compact disc (CD), a digital versatile disc recordable (DVD-R), a blu-ray disc (BD) (registered trademark) can be used, for example.

The controller 170 controls each unit of the information processing apparatus 100 based on control programs stored in the memory 160. For example, the controller 170 controls reception operation and transmission operation of each of the data processing unit 111, the transmission processing unit 112, and the wireless interface unit 113. For example, the controller 170 performs operation of determining a used frequency, ordering formation or transmission of control messages, and interpreting control messages, for example. Note that the control message is notifying information such as a beacon, a beacon reception response, a probe request, and a probe response. As described above, the information processing apparatus 100 can receive broadcast waves and display an image based on the broadcast waves on the display 140. Thus, the controller 170 can obtain broadcast waves through a broadcast reception unit (not illustrated) and display an image based on the broadcast waves on the display 140.

"Wi-Fi CERTIFIED Miracast Release-1"

Wi-Fi CERTIFIED Miracast release-1 formulated by Wi-Fi Alliance will be described here.

FIG. 3 to FIG. 5 are sequence charts illustrating communication processing examples of the source device 50 and the sink device 60 that are bases of an embodiment of the present disclosure.

FIG. 6 and FIG. 7 are diagrams illustrating examples of an RTSP message exchanged between the source device 50 and the sink device 60 that are bases of an embodiment of the present disclosure. In FIG. 6 and FIG. 7, a name of an RTSP message is indicated in a section of Message ID. Moreover, whether an RTSP message is a request or a response is indicated in a section of req/res (direction). In addition, an RTSP message from the source device to the sink device is indicated by (src→snk), and an RTSP message from the sink device to the source device is indicated by (snk→src).

FIG. 3 and FIG. 4 indicate a flow from the discovery of a device to the start of AV stream transmission by Wi-Fi CERTIFIED Miracast. FIG. 5 illustrates a flow of stream control from the determination of an AV format to the start of AV stream transmission by an RTSP in the processing illustrated in FIG. 3 and FIG. 4.

Here, in Wi-Fi Direct, a plurality of devices detect the existence of one another (device discovery, service discovery). Then, after devices connected to each other are selected, device authentication is performed using Wi-fi protected setup (WPS) between the selected devices so that direct connection is established therebetween. Moreover, in Wi-Fi Direct, a plurality of devices determine whether they function as a group owner or a client, and form a communication group.

In the communication processing example illustrated in FIG. 3 and FIG. 4, a part of packet transmission and reception is omitted. For example, packet exchange for using WPS is necessary in the initial connection, as described above, and packet exchange is necessary also in transmission and reception of an authentication request/response, and the like. However, FIG. 3 and FIG. 4 omit the illustration of such packet exchange, and illustrate only connection of the second time or later.

Note that although FIG. 3 and FIG. 4 illustrate a communication processing example between the source device 50 and the sink device 60, the same applies in communication processing between other devices.

First, device discovery is performed between the source device 50 and the sink device 60 (71). For example, the source device 50 transmits a probe request (a response request signal) and receives a probe response (a response signal) corresponding to the probe request from the sink device 60. In this manner, the source device 50 and the sink device 60 can discover the existence of each other. Moreover, device discovery allows acquisition of a device name, a kind (a TV, a PC, a smartphone, etc.), a source supporting device/sink supporting device of a partner, and the like.

Subsequently, service discovery is performed between the source device 50 and the sink device 60 (72). For example, the source device 50 transmits a service discovery query for inquiring service supported by the sink device 60 found in device discovery. Then, the source device 50 receives a service discovery response from the sink device 60, thereby obtaining service supported by the sink device 60. That is, the source device 50 can obtain, through service discovery, service performed by a partner, detailed available capability of a partner, and the like. The service performed by a partner includes service, and a protocol (digital living network alliance (DLNA), a digital media renderer (DMR), etc.), for example.

Then, a user performs operation of selecting a partner to connect (connection partner selection operation) (73). The connection partner selection operation may occur in only one of the source device 50 and the sink device 60. For example, a connection partner selection screen is displayed on the display of the source device 50, and the sink device 60 is selected as a connection partner by user operation on the connection partner selection screen.

After the user performs connection partner selection operation (73), group owner negotiation is performed between the source device 50 and the sink device 60 (74). FIG. 3 and FIG. 4 illustrate an example in which the source device 50 becomes a group owner 75 and the sink device 60 becomes a client 76 as a result of the group owner negotiation.

Next, various kinds of processing (77 to 81) are performed between the source device 50 and the sink device 60, whereby direct connection is established. That is, association (second layer (L2) link establishment) (77), secure link establishment (78), and IP address assignment (79) are performed sequentially. Moreover, TCP connection establishment (80) and stream control by RTSP (81) are performed sequentially.

Then, AV data is transmitted in a MPEG2-TS from the source device 50 to the sink device 60 (82).

In this manner, in Wi-Fi CERTIFIED Miracast release-1, AV data streaming is possible at real time from the source device 50 to the sink device 60. However, in this standard, whether audio data is to be transmitted from the sink device 60 to the source device 50 cannot be specified.

Moreover, in the case of a sink device with a relatively large display (information processing apparatus 100), as illustrated in FIG. 1, for example, a plurality of screens may be displayed on the display. In this case, it is considered that sound of one screen among a plurality of screens is output. For example, it is possible to arrange so that sound of contents specified as a main screen by the user is output and sound of contents not specified as a main screen is not output.

Also in such a case, image data and audio data (a sub screen) not specified as a main screen are also transmitted using Wi-Fi CERTIFIED Miracast, which indicates that audio data not to be output is transmitted. In this case, transmission of audio data not to be output may press a band of a wireless section.

Moreover, transmission of audio data not to be output may increase power consumption of the source device 50 to be more than necessary. In addition, reception of audio data not to be output may also increase power consumption of the sink device 60 to be more than necessary.

Then, the embodiment of the present disclosure describes an example in which audio data exchanged between the source device 50 and the sink device 60 is handled appropriately. Note that in the embodiment of the present disclosure, a screen outputting sound is referred to as a main screen and a screen not outputting sound is referred to as a sub screen. Moreover, the main screen and the sub screen may be defined based on a display size or a display position.

"Configuration Example of RTSP Message"

FIG. 8 is a diagram illustrating an example of information exchanged between the information processing apparatuses according to the first embodiment of the present disclosure. FIG. 8 illustrates an example of a definition by augmented backus-naur form (ABNF) syntax when a new parameter (WFD-audio-stream-control) is defined in an RTSP.

FIG. 9 is a diagram illustrating an example of information exchanged between the information processing apparatuses according to the first embodiment of the present disclosure. FIG. 9 illustrates configuration examples of an RTSP M3 request and an RTSP M3 response. In FIG. 9, the information surrounded by dotted rectangles 401 to 404 is different from the example illustrated in FIG. 6.

FIG. 10 and FIG. 11 are diagrams illustrating examples of information exchanged between the information processing apparatuses according to the first embodiment of the present disclosure. FIG. 10 and FIG. 11 illustrate configuration examples of a newly defined RTSP M110 request and RTSP M110 response.

Here, a specific function indicates each function exerted in each embodiment of the present disclosure. For example, the first embodiment of the present disclosure describes an example in which the specific function is a function of reducing an audio data amount in a stream to be transmitted to the sink device and transmitting the stream to the sink device based on a request from the sink device.

For example, when the source device (information processing apparatus 200) is adaptable to the specific function, the source device (information processing apparatus 200) transmits an RTSP M3 request message containing wfd_audio_stream_control (dotted rectangle 402 illustrated in FIG. 9). In this manner, the source device (information processing apparatus 200) shows that the source device is adaptable to the specific function to the sink device (information processing apparatus 100), and inquiries whether the sink device (information processing apparatus 100) is adaptable to the specific function.

Here, the sink device not adaptable to the specific function transmits a response of "none" in an RTSP M3 response message. Thus, after receiving such a response, the source device (information processing apparatus 200) does not use the specific function.

Moreover, the sink device (information processing apparatus 100) adaptable to the specific function sets an adaptable bit to 1, and transmits it in an RTSP M3 response message to the source device (information processing apparatus 200).

Here, in the dotted rectangle 404 illustrated in FIG. 9, a value (C) of wfd_audio_stream_control is indicated by a hexadecimal number. This value is 12 in a decimal number and 1100 in a binary number of 4 bit. This indicates that the value (C) of wfd_audio_stream_control corresponds to (re-) include audio at a bit position B3 and reduce audio at a bit position B2 that are illustrated in FIG. 8.

Moreover, when reduction of audio data is triggered in the sink device (information processing apparatus 100), the sink device (information processing apparatus 100) transmits a message indicating such a fact to the source device, for example. The sink device (information processing apparatus 100) transmits the RTSP M110 request message illustrated in FIG. 10 (specified by information surrounded by a dotted rectangle 405), for example.

In this manner, the sink device can request the source device to reduce audio data based on the first trigger. Here, the first trigger may be caused by user operation (e.g., switching operation between a main screen and a sub screen), for example.

Moreover, the source device having received the RTSP M110 request message illustrated in FIG. 10 transmits an OK in the RTSP M110 response message illustrated in FIG. 10. Subsequently, the source device reduces an audio data amount in a stream to be transmitted to the sink device and transmits the stream to the sink device in accordance with an order from the sink device.

A method of reducing audio data will be explained here.

For example, the source device can perform the first sound data reduction such that a PES payload data amount is reduced in a PES packet stored in a TS packet specified by a PID without changing the PID specifying sound data transmission described in a PMT and a PES packet containing a PTS in a PES header portion is generated almost periodically. The source device multiplexes and transmits the PES packet for sound signal transmission in which the data amount is reduced and the PES packet for image signal transmission. In this case, the source device can reduce the data amount by making the PES payload data amount to substantially zero or completely zero.

In this case, the data may not contain any PES payload, or data may contain a stuffing byte but not actual audio data.

Moreover, it is preferable to set a PES packet generation cycle to be approximately 100 msec. Thus, even a sink device reproducing video in synchronization with an audio clock can reproduce the audio clock and reproduce video with appropriate clock synchronization while preventing free run of the clock.

Moreover, when the sink device performs demultiplexing on an MPEG2-TS multiplex signal, for example, the sink device discards data contained in a PES payload and extracts a PTS contained in a PES header portion in a PES packet stored in a TS packet specified by a PID specifying sound data transmission described in a PMT.

In this manner, the first embodiment of the present disclosure describes the example using, as an audio data reduction method, the first sound data reduction method in which the PTS is retained.

Moreover, when the re-inclusion of audio data is triggered in the sink device (information processing apparatus 100), the sink device (information processing apparatus 100) transmits a message indicating such a fact to the source device, for example. The sink device (information processing apparatus 100) transmits the RTSP M110 request message illustrated in FIG. 11 (specified by information surrounded by a dotted rectangle 406), for example.

Moreover, the source device having received the RTSP M110 request message illustrated in FIG. 11 transmits an OK in the RTSP M110 response message illustrated in FIG. 11. Subsequently, the source device restores an original audio data amount in a stream to be transmitted to the sink device and transmits the stream to the sink device in accordance with an order from the sink device.

In this manner, the controller of the sink device can request the source device to restore an original audio data amount based on the second trigger while receiving an MPEG2-TS multiplex signal in which the audio data amount is reduced. Here, the second trigger may be caused by user operation (e.g., switching operation between a main screen and a sub screen), for example.

Moreover, when requested to restore an original sound data amount by the sink device while transmitting the PES packet for sound signal transmission in which the data amount is reduced by the first sound data reduction and the PES packet for image signal transmission after multiplexing them, for example, the controller of the source device performs control to store normal sound data in a PES payload, and multiplex and transmit the PES packet for sound signal transmission and the PES packet for image signal transmission.

The controller of the sink device performs control to extract sound data contained in a PES payload when performing demultiplexing on an MPEG2-TS multiplex signal received from the source device after the request.

Main Screen Display Switching Example

The following will describe an example in which when a screen of the source device is displayed on the sink device, the sink device receives broadcast waves and newly displays a screen based on the broadcast waves.

Figure 12B:
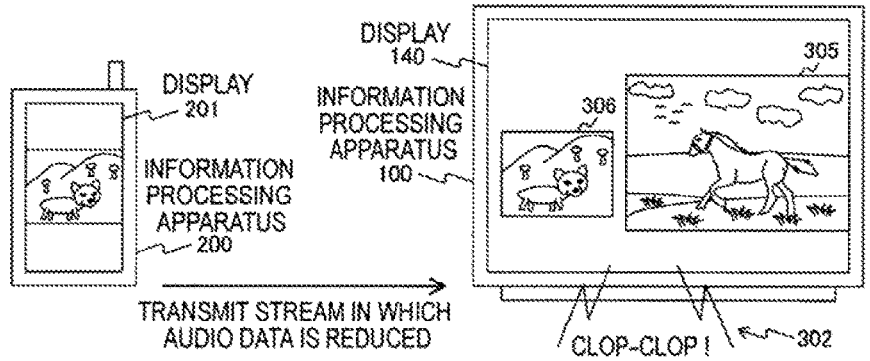
Figure 12C:
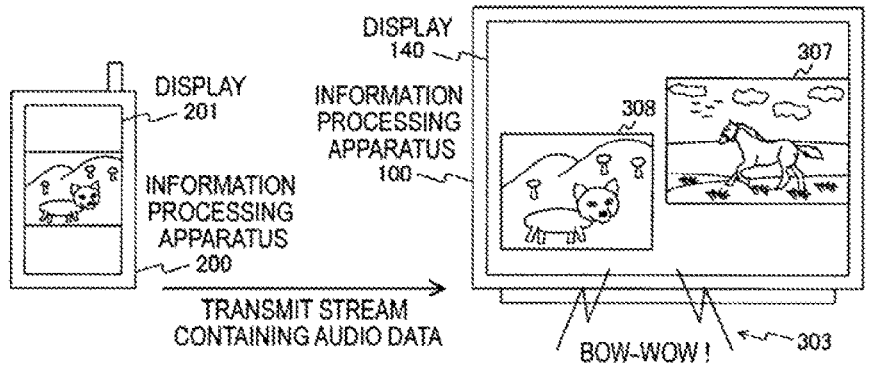

FIGS. 12A, 12B and 12C are diagrams illustrating a shift example of a screen displayed on the display 140 and sound information output from the sound output unit 150 in the information processing apparatus 100 according to the first embodiment of the present disclosure.

FIG. 13 is a diagram illustrating a shift example of information exchanged between the information processing apparatus 100 and the information processing apparatus 200 according to the first embodiment of the present disclosure. FIG. 13 illustrates an example of exchange of information corresponding to FIGS. 12A, 12B and 12C.

FIG. 12A illustrates an example of the case in which an image and sound of the image from the information processing apparatus 200 are output from the information processing apparatus 100. That is, FIG. 12A illustrates an example in which, with setting of audio included, stream transmission is performed from the information processing apparatus 200 to the information processing apparatus 100 using Wi-Fi CERTIFIED Miracast (311, 312 illustrated in FIG. 13). In this case, sound 301 of the image from the information processing apparatus 200 is output from the sound output unit 150.

FIG. 12B illustrates an example of the case in which, in the state illustrated in FIG. 12A, a user performs setting for receiving broadcast waves and displaying an image based on the broadcast waves on the display 140 through such user operation (313 illustrated in FIG. 13). Moreover, it is supposed that, through user operation, the user also performs setting for displaying two screens of an image 306 from the information processing apparatus 200 and an image 305 based on the broadcast waves on the display 140 at the same time. In addition, through such user operation, it is supposed that the user sets the image 305 based on the broadcast waves as a main screen.

In this case, the information processing apparatus 100 transmits the RTSP M110 request message (illustrated in FIG. 10) to the information processing apparatus 200 and requests reduction of audio data (314, 315 illustrated in FIG. 13). Moreover, the information processing apparatus 200 transmits an OK in the RTSP M110 response message (illustrated in FIG. 10) to the information processing apparatus 100 (316, 317 illustrated in FIG. 13).

Subsequently, the information processing apparatus 200 transmits a stream in which the audio data is reduced to the information processing apparatus 100 (318, 319 illustrated in FIG. 13). In this case, sound of the image 306 from the information processing apparatus 200 is not output, as illustrated in FIG. 12B. That is, when the image 305 based on the broadcast waves is set as a main screen, sound of the image 306 from the information processing apparatus 200 is not output. Then, the sound 302 of the image 305 based on the broadcast waves is output from the sound output unit 150.

FIG. 12C illustrates an example of the case in which, in the state illustrated in FIG. 12B, an image 307 based on the broadcast waves is set to a sub screen and an image 308 from the information processing apparatus 200 is set to a main screen by user operation (320 illustrated in FIG. 13).

In this case, the information processing apparatus 100 transmits the RTSP M110 request message (illustrated in FIG. 11) to the information processing apparatus 200 and requests addition of audio data (321, 322 illustrated in FIG. 13). Moreover, the information processing apparatus 200 transmits an OK in the RTSP M110 response message (illustrated in FIG. 11) to the information processing apparatus 100 (323, 324 illustrated in FIG. 13).

Subsequently, the information processing apparatus 200 transmits a stream containing audio data to the information processing apparatus 100 (325, 326 illustrated in FIG. 13). In this case, sound of the image 307 based on the broadcast waves is not output, as illustrated in FIG. 12C. Moreover, sound 303 of the image 308 from the information processing apparatus 200 is output from the sound output unit 150.

Here, as illustrated in FIG. 12A, when an image from the information processing apparatus 200 is displayed as a main image on the display 140, the sound 301 of the image is output from the sound output unit 150. In this case, it is assumed that a user viewing the image adjusts a sound volume setting value (volume) of the sound 301 output from the sound output unit 150 in accordance with sound pressure of the sound 301. Then, when the sound volume setting value of the sound 301 output from the sound output unit 150 is adjusted, the controller 170 of the information processing apparatus 100 stores the adjusted value in the memory 160.

Moreover, as illustrated in FIG. 12B, when the image 305 based on the broadcast waves is displayed as a main image on the display 140, the sound 302 of the image 305 is output from the sound output unit 150. Also in this case, it is assumed that a user viewing the image 305 adjusts a sound volume setting value (volume) of the sound 302 output from the sound output unit 150 in accordance with sound pressure of the sound 302 while the broadcast waves is being received.

As illustrated in FIG. 12C, when the image 308 from the information processing apparatus 200 is set to a main image, the controller 170 of the information processing apparatus 100 sets a sound volume corresponding to a value stored in the memory 160. That is, when the image 308 from the information processing apparatus 200 is set to a main image, the controller 170 of the information processing apparatus 100 discards the sound volume setting value (volume) set while the sound 302 of the image 305 based on the broadcast waves is output, and resets a sound volume used when the image from the information processing apparatus 200 is set as a main image.

In this manner, the controller 170 of the information processing apparatus 100 stores, in the memory 160, the sound volume setting value of sound output before a request is made to the source device. Then, the controller 170 of the information processing apparatus 100 requests the source device to restore an original sound data amount and can set the sound volume setting value stored in the memory 160 at the timing when sound data contained in a PES payload is extracted after the request, for example.

In this manner, it is possible to prevent output of sound volume not intended by the user when switching the main screen, for example.

"Operation Example of Sink Device"

FIG. 14 is a flowchart illustrating an example of processing procedures of reception processing by the information processing apparatus 100 according to the first embodiment of the present disclosure. FIG. 14 illustrates an example of the case in which both the source device and the sink device are adaptive to the specific function.

First, the controller 170 of the information processing apparatus 100 performs processing of starting Wi-Fi CERTIFIED Miracast (Step S801).

Then, the controller 170 starts a session of Wi-Fi CERTIFIED Miracast (Step S802). A stream exchanged in this case contains audio data.

Next, the controller 170 performs processing of receiving, decoding, and reproducing the stream containing the audio data, for example (Step S803). In this manner, an image based on image data contained in the received stream is displayed on the display 140, and sound based on audio data contained in the received stream is output from the sound output unit 150.

Subsequently, the controller 170 determines whether an image not requiring audio data exists among the images displayed on the display 140 (images based on the received streams) (Step S804). For example, as illustrated in FIG. 12A and FIG. 12B, when user operation for receiving broadcast waves and displaying them as a main screen, it is determined that audio data from the source device is unnecessary (Step S804).

When an image not requiring audio data does not exist (Step S804), the operation returns to Step S803. When an image not requiring audio data exists (Step S804), the controller 170 transmits a message for requesting reduction of audio data to the source device transmitting the stream corresponding to the image not requiring audio data (Step S805). For example, the controller 170 transmits the RTSP M110 request message illustrated in FIG. 10.

After the message is transmitted, the communication unit 110 receives a response to the message from the source device (Step S806). The source device transmits an OK in the RTSP M110 response message illustrated in FIG. 10, for example.

After the response to the message for requesting reduction of audio data is received (Step S806), the controller 170 performs processing of receiving, decoding, and reproducing a stream in which the audio data is reduced, for example (Step S807). In this case, an image based on image data contained in the received stream is displayed on the display 140. However, the received stream does not contain audio data, and thus no sound is output.

Subsequently, the controller 170 determines whether an image requiring audio data exists among the images displayed on the display 140 (images based on the received streams) (Step S808). For example, as illustrated in FIG. 12B and FIG. 12C, when user operation for displaying an image from the source device as a main screen is performed, it is determined that audio data from the source device is necessary (Step S808).

When an image requiring audio data (image based on the received stream) does not exist (Step S808), the operation returns to Step S807. When an image requiring audio data exists (Step S808), the controller 170 transmits a message for requesting addition of audio data to the source device transmitting the stream corresponding to the image requiring audio data (Step S809). For example, the controller 170 transmits the RTSP M110 request message illustrated in FIG. 11, for example.

After the message is transmitted, the communication unit 110 receives a response to the message from the source device (Step S810). The source device transmits an OK in the RTSP M110 response message illustrated in FIG. 11, for example.

After the response to the message for requesting addition of audio data is received (Step S810), the controller 170 determines whether the finish of reception processing has been ordered (Step S811). When the finish of reception processing has not been ordered (Step S811), the operation returns to Step S803, and the controller 170 performs processing of receiving, decoding, and reproducing the stream containing audio data, for example (Step S803). By contrast, when the finish of reception processing has been ordered (Step S811), the operation of reception processing is finished. Note that Steps S803 and S807 are examples of the communication described in claims. Note that Steps S805 to S807 are examples of the control described in claims.

"Operation Example of Source Device"

FIG. 15 is a flowchart illustrating an example of processing procedures of transmission processing by the information processing apparatus 200 according to the first embodiment of the present disclosure. FIG. 15 illustrates an example of the case in which both the source device and the sink device are adaptive to the specific function.

First, the controller of the information processing apparatus 200 (corresponding to the controller 170 of FIG. 2) performs processing of starting Wi-Fi CERTIFIED Miracast (Step S821).

Then, the controller of the information processing apparatus 200 starts a session of Wi-Fi CERTIFIED Miracast (Step S822). A stream exchanged in this case contains audio data.

Next, the controller of the information processing apparatus 200 generates a stream containing audio data and transmits the generated stream to the sink device (Step S823). In this manner, an image based on image data contained in the transmitted stream is displayed on the display of the sink device, and sound based on audio data contained in the received stream is output from the sound output unit of the sink device.

Subsequently, the controller of the information processing apparatus 200 determines whether a message for requesting reduction of audio data has been received from the sink device (Step S824). For example, the controller of the information processing apparatus 200 determines whether the RTSP M110 request message illustrated in FIG. 10 has been received. When the message has not been received from the sink device (Step S824), the operation returns to Step S823.

When the message has been received from the sink device (Step S824), the controller of the information processing apparatus 200 transmits a response to the message to the sink device (Step S825). The information processing apparatus 200 transmits an OK in the RTSP M110 response message illustrated in FIG. 10, for example.

Next, the controller of the information processing apparatus 200 generates a stream in which the audio data is reduced and transmits the generated stream to the sink device (Step S826). In this case, an image based on image data contained in the received stream is displayed on the display of the sink device. However, no sound is output.

Subsequently, the controller of the information processing apparatus 200 determines whether a message for requesting addition of audio data has been received from the sink device (Step S827). For example, the controller of the information processing apparatus 200 determines whether the RTSP M110 request message illustrated in FIG. 11 has been received. When the message has not been received from the sink device (Step S827), the operation returns to Step S826.

When the message has been received from the sink device (Step S827), the controller of the information processing apparatus 200 transmits a response to the message to the sink device (Step S828). The information processing apparatus 200 transmits an OK in the RTSP M110 response message illustrated in FIG. 11, for example.

Next, the controller of the information processing apparatus 200 determines whether the finish of transmission processing has been ordered (Step S829). When the finish of transmission processing has not been ordered (Step S829), the operation returns to Step S823. By contrast, when the finish of transmission processing has been ordered (Step S829), the operation of transmission processing is finished. Note that Steps S823 and S826 are examples of the communication described in claims. Moreover, Step S826 is an example of the control described in claims.

2. Second Embodiment

The second embodiment of the present disclosure describes an example in which the audio data is reduced at the start of streaming using Wi-Fi CERTIFIED Miracast. Moreover, the second embodiment of the present disclosure describes an example in which the use of a sound data reduction method (second sound data reduction method) other than the sound data reduction method described in the first embodiment of the present disclosure is requested. That is, in the second embodiment of the present disclosure, a method of reducing audio data can be specified. Thus, in the second embodiment of the present disclosure, further extension is introduced to the structure of a newly provided RTSP parameter.

Note that the configurations of information processing apparatuses in the second embodiment of the present disclosure are substantially same as those of the information processing apparatuses 100, 200 illustrated in FIG. 1 and the like. Thus, the elements common to the first embodiment of the present disclosure are represented with the same reference numerals as in the first embodiment of the present disclosure, and the description of these elements is partially omitted.

"Configuration Example of RTSP Message"

FIG. 16 is a diagram illustrating an example of information exchanged between information processing apparatuses according to the second embodiment of the present disclosure. FIG. 16 illustrates an example of the case in which further extension is introduced to the structure of a newly provided RTSP parameter.

FIG. 17 is a diagram illustrating an example of information exchanged between information processing apparatuses according to the second embodiment of the present disclosure. FIG. 17 illustrates configuration examples of an RTSP M3 request and an RTSP M3 response. In FIG. 17, the information surrounded by dotted rectangles 411 to 414 is different from the example illustrated in FIG. 6.

FIG. 18 is a diagram illustrating an example of information exchanged between information processing apparatuses according to the second embodiment of the present disclosure. FIG. 18 illustrates configuration examples of a newly defined RTSP M110 request and RTSP M110 response.

For example, when the source device (information processing apparatus 200) is adaptable to the specific function, the source device (information processing apparatus 200) transmits an RTSP M3 request message including wfd_audio_stream_control (dotted rectangle 412 illustrated in FIG. 17). In this manner, the source device (information processing apparatus 200) shows that the source device is adaptable to the specific function to the sink device (information processing apparatus 100), and inquiries whether the sink device (information processing apparatus 100) is adaptable to the specific function.

Here, the sink device not adaptable to the specific function transmits a response of "none" in an RTSP M3 response message. Thus, after receiving such a response, the source device (information processing apparatus 200) does not use the specific function.

Moreover, the sink device (information processing apparatus 100) adaptable to the specific function sets an adaptable bit to 1, and transmits it to the source device (information processing apparatus 200) in an RTSP M3 response message.

Here, in the dotted rectangle 414 illustrated in FIG. 17, a value (F) of wfd_audio_stream_control is indicated by a hexadecimal number. This value is 15 in a decimal number and 1111 in a binary number of 4 bit. This indicates that the value (F) of wfd_audio_stream_control corresponds to any of bit positions B3 to B1 illustrated in FIG. 16 and that reduction of audio data is requested from the start of streaming. That is, it is indicated that the value (F) of wfd_audio_stream_control corresponds to (re-) include audio at a bit position B3 and reduce audio at a bit position B2 illustrated in FIG. 16. Moreover, it is indicated that the value (F) of wfd_audio_stream_control corresponds to audio data reduction using a reduction method different from reduce audio at a bit position B and that reduction of audio data is requested from the start of streaming.

That is, FIG. 17 illustrates an example of an RTSP M3 response message requesting reduction of audio data from the start of streaming. The source device having received the RTSP M3 response message reduces data using any of data reduction methods to which the sink device is adaptive and then transmits the stream to the sink device. For example, the reduction method same as that of the first embodiment of the present disclosure (first sound data reduction method) can be used.

Moreover, when re-inclusion of audio data is triggered, the sink device transmits a newly provided RTSP M110 request message (illustrated in FIG. 11), for example. The source device having received the RTSP M110 request message transmits an OK in the RTSP M110 response message (illustrated in FIG. 11). Then, the source device restores an original audio data amount and transmits it in accordance with an order from the sink device. Note that the configurations of the RTSP M110 request message and the RTSP M110 response message are same as in FIG. 11, and thus the detailed explanation thereof is omitted.

Here, it is assumed that a user operates the sink device to set an image based on broadcast waves as a main screen and set an image from the source device as a sub screen. In this case, the sink device can determine that audio data of the image from the source device has become unnecessary. Thus, with such operation as a trigger, the sink device requests the source device to reduce audio data. In this case, it is supposed that the sink device is designed and implemented so as to smoothly display an image from the source device even without an audio PTS. Thus, the sink device can specify another reduction method (e.g., a reduction method in which no audio PES packet is transmitted so as to further reduce a data amount).

FIG. 18 illustrates configuration examples of an RTSP M110 request and an RTSP M110 response transmitted in this case.

The source device having received the RTSP M110 request message illustrated in FIG. 18 transmits an OK in the RTSP M110 response message. Then, the source device reduces data regarding a stream transmitted after the transmission of such an OK by the second sound data reduction method, and transmits data other than a PES packet for audio data without multiplexing the PES packet for audio data. Here, the second sound data reduction method is a reduction method in which no PES packet carrying audio data is generated in a stream without including information of a PID specifying audio data.

In this manner, the source device performs the second sound data reduction in which no PES packet carrying audio data is generated without including information of a PID specifying audio data, and can transmit a PES packet for image signal transmission without multiplexing a PES packet for sound signal transmission.

The sink device receives a stream in which the audio data is reduced by the second sound data reduction method and decodes video data contained in the received stream.

It is assumed that, in this state, the user cancels two screens and specifies the display of only an image from the source device. In this case, the sink device can determine that audio data of the image from the source device has become necessary. Thus, with such operation as a trigger, the sink device requests the source device to restore original audio data in an RTSP M110 request message.

The configuration examples of an RTSP M110 request and an RTSP M110 response transmitted in this case are same as in FIG. 11.

The source device transmits a stream including audio data after transmitting an OK in the RTSP M110 response illustrated in FIG. 11. That is, the source device includes information of a PID specifying audio data in a PMT in the stream and generates a PES packet carrying audio data using a TS packet specified by the PID. Then, the source device multiplexes the generated PES packet carrying audio data and a PES packet carrying video data, and transmits the result to the sink device.

In this manner, when requested to restore an original sound data amount by the sink device while transmitting the PES packet for image signal transmission without multiplexing the PES packet for sound signal transmission after the second sound data reduction, the source device includes a PID specifying sound data transmission in a PMT, stores normal sound data in a PES payload, and multiplexes and transmits the PES packet for sound signal transmission and the PES packet for image signal transmission.

The sink device receives a stream containing audio data, performs demultiplexing on video data and audio data contained in the received stream, and decodes and reproduces the data, for example.

"Main Screen Display Switching Example"

The following will describe an example of the case in which when a screen based on broadcast waves is displayed on the sink device, the sink device newly displays an image from the source device.

Figure 19A:
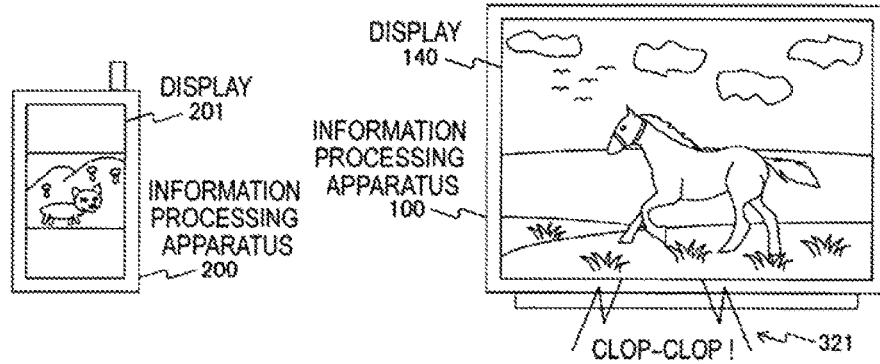
FIGS. 19A, 19B and 19C are diagrams illustrating a shift example of a screen displayed on the display 140 and sound information output from the sound output unit 150 in the information processing apparatus 100 according to the second embodiment of the present disclosure.
Figure 19B:
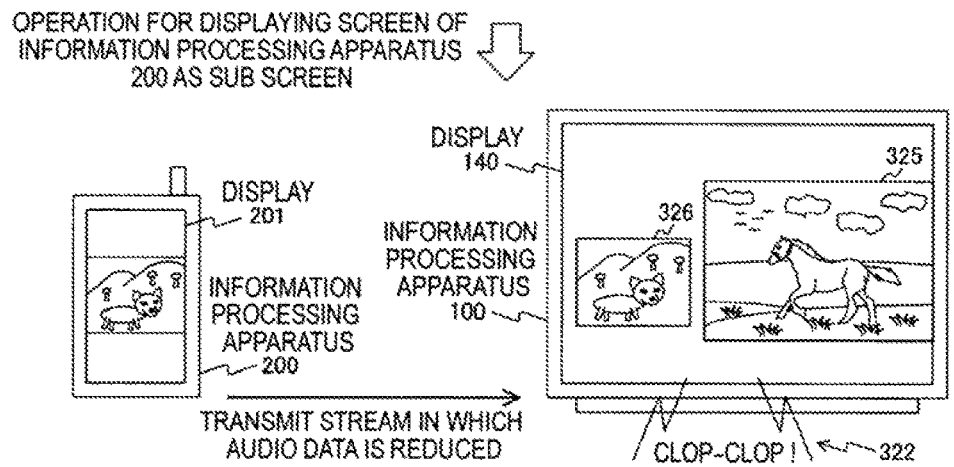
Figure 19C:
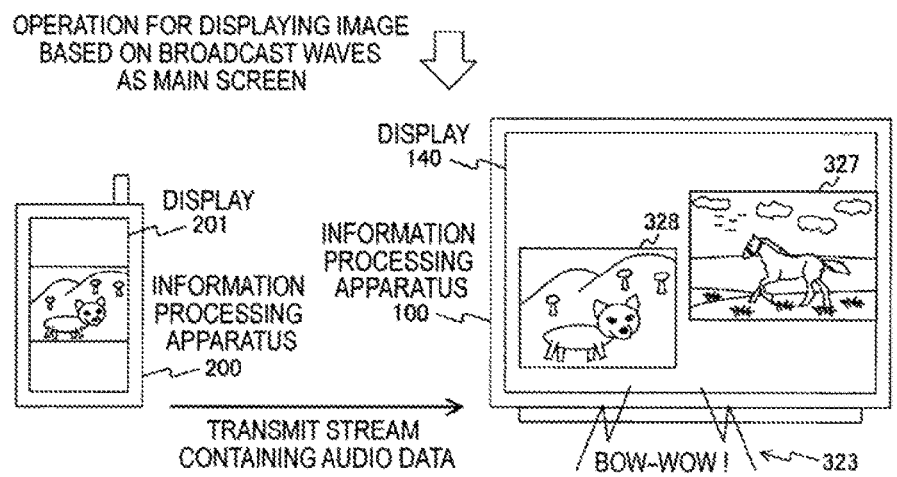

FIGS. 19A, 19B and 19C are diagrams illustrating a shift example of a screen displayed on the display 140 and sound information output from the sound output unit 150 in the information processing apparatus 100 according to the second embodiment of the present disclosure.

FIG. 20 is a diagram illustrating a shift example of information exchanged between the information processing apparatus 100 and the information processing apparatus 200 according to the second embodiment of the present disclosure. FIG. 20 illustrates an example of exchange of information corresponding to FIGS. 19A, 19B and 19C.

FIG. 19A illustrates an example of the case in which broadcast waves are received and an image and sound of the image based on the broadcast waves are output from the information processing apparatus 100.

FIG. 19B illustrates an example of the case in which, in the state illustrated in FIG. 19A, transmission of a stream from the information processing apparatus 200 to the information processing apparatus 100 has been started using Wi-Fi CERTIFIED Miracast by user operation of the information processing apparatus 200.

In this case, the controller 170 of the information processing apparatus 100 detects connection using Wi-Fi CERTIFIED Miracast. Then, the controller 170 of the information processing apparatus 100 automatically sets an image based on broadcast waves displayed on one screen to a main screen and a newly added image from the information processing apparatus 200 to a sub screen. In this manner, the controller 170 of the information processing apparatus 100 can determine that the image from the information processing apparatus 200 is set as a sub screen (331 illustrated in FIG. 20).

Moreover, with such determination as a trigger, the controller 170 of the information processing apparatus 100 requests the information processing apparatus 200 to reduce audio data and transmit it. In this case, the information processing apparatus 100 sets a least significant bit B0 of control-bitmap to 1 (illustrated in FIG. 17) in an RTSP M3 response message that is a response to a received RTSP M3 request message, and transmits the message to the information processing apparatus 200, thereby requesting reduction of audio data (332, 333 illustrated in FIG. 20). At that time, the controller 170 of the information processing apparatus 100 does not specify a reduction method. Thus, the information processing apparatus 200 can determine a reduction method automatically or manually. Then, the information processing apparatus 200 transmits a stream in which the audio data is reduced to the information processing apparatus 100 (334, 335 illustrated in FIG. 20).

FIG. 19C illustrates an example of the case in which, in the state illustrated in FIG. 19B, an image 327 based on broadcast waves is set to a sub screen and an image 328 from the information processing apparatus 200 is set to a main screen by user operation (336 illustrated in FIG. 20).

In this case, the information processing apparatus 100 transmits the RTSP M110 request message (illustrated in FIG. 11) to the information processing apparatus 200 and requests addition of audio data (337, 338 illustrated in FIG. 20). Moreover, the information processing apparatus 200 transmits an OK in the RTSP M110 response message (illustrated in FIG. 11) to the information processing apparatus 100 (339, 340 illustrated in FIG. 20).

Subsequently, the information processing apparatus 200 transmits a stream containing audio data to the information processing apparatus 100 (341, 342 illustrated in FIG. 20). In this case, sound of the image 327 based on the broadcast waves is not output, as illustrated in FIG. 19C. Moreover, sound 323 of the image 328 from the information processing apparatus 200 is output from the sound output unit 150.

Here, when the sound 323 of the image 328 from the information processing apparatus 200 starts to be output from the sound output unit 150, large sound may be output suddenly if the volume of the sound 323 is same as that of the sound 322 of the image based on the broadcast waves. Then, when the sound 323 of the image 328 from the information processing apparatus 200 starts to be output from the sound output unit 150, a sound volume setting value (volume) smaller than the sound 322 of the image based on the broadcast waves may be reset.

Moreover, it is assumed that, in the state illustrated in FIGS. 19A, 19B and 19C, the image 327 based on the broadcast waves is set to a main screen and the image 328 from the information processing apparatus 200 is set to a sub screen by user operation (343 illustrated in FIG. 20).

In this case, the information processing apparatus 100 transmits the RTSP M110 request message (illustrated in FIG. 18) to the information processing apparatus 200 and requests reduction of audio data (344, 345 illustrated in FIG. 20). Here, it is assumed that a method in which an audio PES packet is not included (second sound data reduction method) is specified as a method for reducing audio data.

Moreover, the information processing apparatus 200 transmits an OK in the RTSP M110 response message (illustrated in FIG. 18) to the information processing apparatus 100 (346, 347 illustrated in FIG. 20).

Subsequently, the information processing apparatus 200 transmits a stream in which the audio data is reduced to the information processing apparatus 100 (348, 349 illustrated in FIG. 20).

"Operation Example of Sink Device"

FIG. 21 is a flowchart illustrating an example of processing procedures of reception processing by the information processing apparatus 100 according to the second embodiment of the present disclosure. FIG. 21 illustrates an example of the case in which both the source device and the sink device are adaptive to the specific function.

First, the controller 170 of the information processing apparatus 100 determines whether a start trigger of Wi-Fi CERTIFIED Miracast has occurred (Step S831). When the start trigger has not occurred (Step S831), monitoring is continued.

When the start trigger has occurred (Step S831), the controller 170 determines whether audio data is necessary at the time of start (Step S832). When audio data is not necessary at the time of start (Step S832), the controller 170 transmits a message for requesting reduction of audio data to the source device starting to transmit a stream (Step S833). For example, the controller 170 sets a least significant bit B0 of control-bitmap to 1 when transmitting the RTSP M3 response message illustrated in FIG. 17 as a response to the received RTSP M3 request message illustrated in FIG. 17, and requests reduction of audio data.

Then, the controller 170 starts a session of Wi-Fi CERTIFIED Miracast (Step S834). A stream exchanged in this case does not contain audio data.

Next, the controller 170 performs processing of receiving, decoding, and reproducing a stream in which the audio data is reduced, for example (Step S835). In this case, an image based on image data contained in the received stream is displayed on the display 140. However, the received stream does not contain audio data, and thus no sound is output.

Next, the controller 170 determines whether the image (image based on the received stream) displayed on the display 140 requires audio data (Step S836). When audio data is unnecessary (Step S836), the operation returns to Step S835.

When audio data is necessary (Step S836), the controller 170 transmits a message for requesting addition of audio data to the source device transmitting a stream (Step S837). For example, the controller 170 transmits the RTSP M110 request message illustrated in FIG. 11.

After the message is transmitted, the communication unit 110 receives a response to the message from the source device (Step S838). The source device transmits an OK in the RTSP M110 response message illustrated in FIG. 11.

Meanwhile, when audio data is necessary at the time of start (Step S832), the controller 170 transmits a message for requesting inclusion of audio data to the source device starting to transmit a stream (Step S839). For example, the controller 170 transmits the RTSP M3 response message illustrated in FIG. 6.

Then, the controller 170 starts a session of Wi-Fi CERTIFIED Miracast (Step S840). A stream exchanged in this case contains audio data.

Next, the controller 170 performs processing of receiving, decoding, and reproducing a stream containing audio data, for example (Step S841). In this case, an image based on image data contained in the received stream is displayed on the display 140, and sound based on audio data contained in the received stream is output from the sound output unit 150.

Subsequently, the controller 170 determines whether the image displayed on the display 140 (image based on the received stream) does not require audio data (Step S842). When audio data is necessary (Step S842), the operation returns to Step S841.

When audio data is unnecessary (Step S842), the controller 170 determines an audio data reduction method (Step S843). For example, the controller 170 can determine an audio data reduction method based on the number of connected source devices, the performance of the source devices, surrounding communication environments, and the like.

For example, when the first method (first sound data reduction method) is determined (Step S843), the controller 170 transmits a message for requesting reduction of audio data to the source device transmitting a stream (Step S844). For example, the controller 170 transmits the RTSP M110 request message illustrated in FIG. 10.

After the message is transmitted, the communication unit 110 receives a response to the message from the source device (Step S845). The source device transmits an OK in the RTSP M110 response message illustrated in FIG. 10, for example.

For example, when the second method (second sound data reduction method) is determined (Step S843), the controller 170 transmits a message for requesting deletion of audio data to the source device transmitting a stream (Step S846). For example, the controller 170 transmits the RTSP M110 request message illustrated in FIG. 18.

After the message is transmitted, the communication unit 110 receives a response to the message from the source device (Step S847). The source device transmits an OK in the RTSP M110 response message illustrated in FIG. 18.

Next, the controller 170 performs processing of receiving, decoding, and reproducing a stream in which the audio data is deleted, for example (Step S848). In this case, an image based on image data contained in the received stream is displayed on the display 140. However, the received stream does not contain audio data, and thus no sound is output.

Next, the controller 170 determines whether the image (image based on the received stream) displayed on the display 140 requires audio data (Step S849). When audio data is unnecessary (Step S849), the operation returns to Step S848. When audio data is necessary (Step S849), the operation returns to Step S837.

In this manner, the controller 170 can specify, when making a request to the source device, one of the first sound data reduction method in which an MPEG2-TS multiplex signal containing a PES packet carrying sound data is generated and transmitted and the second sound data reduction method in which an MPEG2-TS multiplex signal not containing a PES packet carrying sound data is generated and transmitted.

"Operation Example of Source Device"

FIG. 22 is a flowchart illustrating an example of processing procedures of transmission processing by the information processing apparatus 200 according to the second embodiment of the present disclosure. FIG. 22 illustrates an example of the case in which both the source device and the sink device are adaptive to the specific function.

First, the controller of the information processing apparatus 200 determines whether a start trigger of Wi-Fi CERTIFIED Miracast has occurred (Step S851). When the start trigger has not occurred (Step S851), monitoring is continued.

When the start trigger has occurred (Step S851), the controller of the information processing apparatus 200 determines whether a received RTSP M3 response message specifies that audio data is unnecessary (Step S852).

When it is specified that audio data is unnecessary (Step S852), the controller of the information processing apparatus 200 starts a session of Wi-Fi CERTIFIED Miracast (Step S853). A stream exchanged in this case does not contain audio data.

Next, the controller of the information processing apparatus 200 generates a stream in which the audio data is reduced and transmits the generated stream to the sink device (Step S854). In this case, an image based on image data contained in the received stream is displayed on the display of the sink device. However, no sound is output.

Subsequently, the controller of the information processing apparatus 200 determines whether a message for requesting addition of audio data has been received from the sink device (Step S855). For example, the controller of the information processing apparatus 200 determines whether the RTSP M110 request message illustrated in FIG. 11 has been received. When the message has not been received from the sink device (Step S855), the operation returns to Step S854.

When the message has been received from the sink device (Step S855), the controller of the information processing apparatus 200 transmits a response to the message to the sink device (Step S856). The information processing apparatus 200 transmits an OK in the RTSP M110 response message illustrated in FIG. 11, for example.

When it is specified that audio data is necessary (Step S852), the controller of the information processing apparatus 200 starts a session of Wi-Fi CERTIFIED Miracast (Step S857). A stream exchanged in this case contains audio data.

Next, the controller of the information processing apparatus 200 generates a stream containing audio data and transmits the generated stream to the sink device (Step S858). In this manner, an image based on image data contained in the transmitted stream is displayed on the display of the sink device, and sound based on audio data contained in the transmitted stream is output from the sound output unit of the sink device.

Subsequently, the controller of the information processing apparatus 200 determines whether a message for requesting reduction of audio data has been received from the sink device (Step S859). For example, the controller of the information processing apparatus 200 determines whether the RTSP M110 request message illustrated in FIG. 10 or FIG. 18 has been received. When the message has not been received from the sink device (Step S859), the operation returns to Step S858.

When the message has been received from the sink device (Step S859), the controller of the information processing apparatus 200 confirms an audio data reduction method specified by the message (Step S860). Then, when the reduction method is the first method (the case of the RTSP M110 request message illustrated in FIG. 10) (Step S860), the controller of the information processing apparatus 200 transmits a response to the message to the sink device (Step S861). The controller of the information processing apparatus 200 transmits an OK in the RTSP M110 response message illustrated in FIG. 10, for example.

Moreover, when the reduction method is the second method (the case of the RTSP M110 request message illustrated in FIG. 18) (Step S860), the controller of the information processing apparatus 200 determines whether the information processing apparatus 200 is adaptive to the second method (Step S862). Then, when the information processing apparatus 200 is not adaptive to the second method (Step S862), the operation proceeds to Step S861.

When the information processing apparatus 200 is adaptive to the second method (Step S862), the controller of the information processing apparatus 200 transmits a response to the message to the sink device (Step S863). The information processing apparatus 200 transmits an OK in the RTSP M110 response message illustrated in FIG. 18, for example.

Next, the controller of the information processing apparatus 200 generates a stream in which the audio data is deleted and transmits the generated stream to the sink device (Step S864). In this case, an image based on image data contained in the received stream is displayed on the display of the sink device. However, no sound is output.

Subsequently, the controller of the information processing apparatus 200 determines whether a message for requesting addition of audio data has been received from the sink device (Step S865). When the message has not been received from the sink device (Step S865), the operation returns to Step S864. By contrast, when the message has been received from the sink device (Step S865), the operation proceeds to Step S856.

"Examples Using another Message"

The above has described the example in which a change added to a sequence of RTSP message exchange of Wi-Fi CERTIFIED Miracast release-1 is avoided as much as possible. That is, the above has described the example in which a request for start without including any audio data is contained in an M3 GET_PARAMETER response.

The following will describe a case in which a sequence of RTSP message exchange can be changed such as in a successor standard or own implementation. For example, an M3R request/response message and an M4R request/response message are defined. These are obtained by reversing the directions of an M3 request/response message and an M4 request/response message. Then, capability notification between the source device and the sink device, parameter setting, and the like are performed using the M3R request/response message or the M4R request/response message.

FIG. 23 is a sequence chart illustrating a communication processing example of the source device 50 and the sink device 60 according to the second embodiment of the present disclosure. Note that FIG. 23 illustrates that a newly defined RTSP message is added in the example illustrated in FIG. 5. That is, an RTSP M3R request, an RTSP M3R response, an RTSP M4R request, and an RTSP M4R response are added.

Here, an M3 GET_PARAMETER and an M4 SET_PARAMETER are for transmitting a request from the source device to the sink device. FIG. 23 illustrates a sequence chart of an RTSP message when the reversed message is newly defined.

As illustrated in FIG. 23, the sink device 60 inquires the adaptive capability of the source device 50 (e.g., whether the source device 50 is adaptive to audio data reduction) using the M3R request message (501). The source device 50 notifies the sink device 60 of the adaptive capability of the source device 50 using a response to the M3R request message (M3R response message) (502).

Moreover, the sink device 60 sets, using the M4R request message, such that the source device 50 transmits a stream without including audio data (503). The source device 50 notifies the sink device 60 of an OK using a response to the M4R request message (M4R response message) (504).

FIG. 24 to FIG. 26 are diagrams illustrating examples of information exchanged between the information processing apparatuses according to the second embodiment of the present disclosure.

FIG. 24 illustrates a definition example of a bit when wfd_audio_stream_control is used in a newly defined RTSP message. In this example, the sink device 60 can explicitly notify the source device 50 of the fact that audio is not contained in SET_PARAMETER. Thus, in the example illustrated in FIG. 16, "Initial audio-off" of the least significant bit (at a bit position B0) can be omitted.

FIG. 25 illustrates configuration examples of an RTSP M3R request, an RTSP M3R response, an RTSP M4R request, and an RTSP M4R response.

Next, a configuration example of a concrete message will be described with reference to FIG. 25.

The sink device 60 includes wfd_audio_stream_control (dotted rectangle 420 illustrated in FIG. 25) in an RTSP M3R request message and transmits the message to the source device 50 (501 illustrated in FIG. 23). Thus, the sink device 60 can inquire whether the source device 50 is adaptive to the specific function.

In response to the inquiry, the source device 50 transmits an RTSP M3R response message to the sink device 60, and notifies the sink device 60 of the fact that the source device 50 is adaptive to the specific function (502 illustrated in FIG. 23). This example describes the case in which the source device 50 is adaptive to all of a function of (re-)including audio data, a function of reducing audio data, and a function of reducing audio data by another method. Thus, the source device 50 sets 1110 in a binary number, "E (dotted rectangle 421 of FIG. 25)" in a hexadecimal number and transmits the response (502 illustrated in FIG. 23).

Subsequently, the sink device 60 transmits an RTSP M4R request message to the source device 50, and sets (SET) such that the source device 50 reduces audio data and transmits it (503 illustrated in FIG. 23). In this example, the RTSP M3R response message confirms that the source device 50 has a function of reducing audio data by another method. Thus, the sink device 60 sets only the bit position B1 illustrated in FIG. 24 to 1, and can specify transmission without including any audio data. In response to this, the source device 50 transmits an OK in the RTSP M4R response message (illustrated in FIG. 25) to the sink device 60 (504 illustrated in FIG. 23).

In this manner, the sink device 60 sets only the bit position B1 illustrated in FIG. 24 to 1. Thus, 0010 in a binary number and "2 (dotted rectangle 422 of FIG. 25)" in a hexadecimal number are used as RTSP parameter setting values.

Then, the source device 50 sets a format for transmitting an RTSP M4 request. In this case, the source device 50 may perform setting including an audio format, as described above, or perform setting without including an audio format. FIG. 26 illustrates an example in which setting is performed without including an audio format.

FIG. 26 illustrates configuration examples of an RTSP M4 request and an RTSP M4 response.

Here, it is assumed that transmission without audio data from the start is specified, a method in which no audio elementary stream is included is selected as an audio reduction method, and an RTSP M4 request message is transmitted without including any information of an audio format. In this case, when the sink device 60 requests the source device 50 to add audio next using the RTSP M110 request message, the source device 50 needs to notify the sink device 60 of an OK using the RTSP M110 response message, and further add a parameter for specifying an audio format and transmit it using an RTSP M4 request message. The configuration example of the RTSP M4 request message used in this case is same as in the example illustrated in FIG. 7, and thus the explanation thereof is omitted here.

3. Third Embodiment

The third embodiment of the present disclosure describes an example in which the sink device detects the movement or existence of a person and requests reduction of audio data based on the detection result.

Note that the configurations of information processing apparatuses in the third embodiment of the present disclosure are substantially same as those of the information processing apparatuses 100, 200 illustrated in FIG. 1 and the like. Thus, the elements common to the first embodiment of the present disclosure are represented with the same reference numerals as in the first embodiment of the present disclosure, and the description of these elements is omitted.

"Main Screen Display Switching Example"

The following describes first an example of the case in which when a screen of the source device is displayed on the sink device, output of sound is controlled based on whether a user is viewing the screen.

Figure 27A:
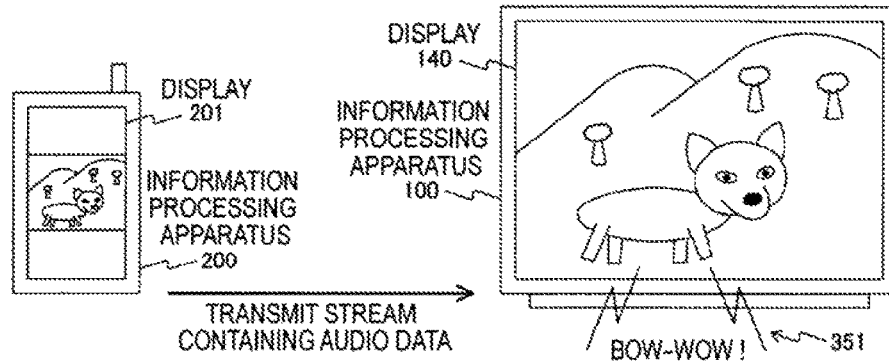
FIGS. 27A, 27B and 27C are diagrams illustrating a shift example of a screen displayed on the display 140 and sound information output from the sound output unit 150 in the information processing apparatus 100 according to the third embodiment of the present disclosure.
Figure 27B:
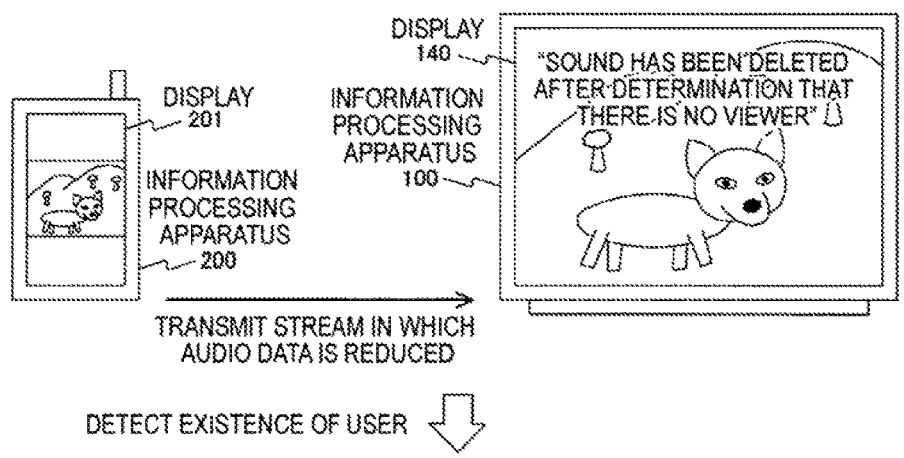
Figure 27C:
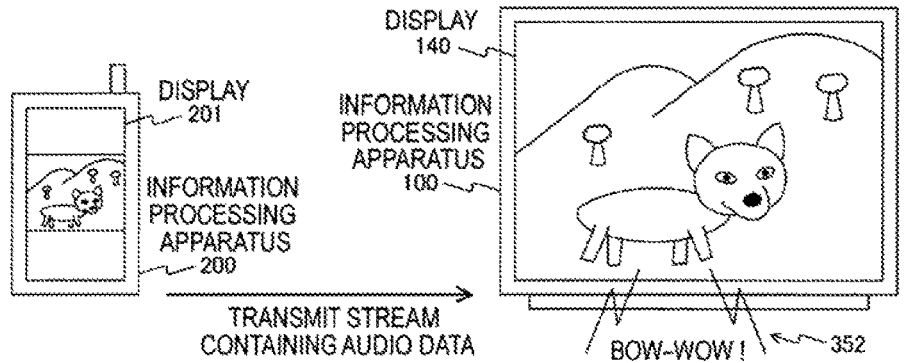

FIGS. 27A, 27B and 27C are diagrams illustrating a shift example of a screen displayed on the display 140 and sound information output from the sound output unit 150 in the information processing apparatus 100 according to the third embodiment of the present disclosure.

FIG. 28 is a diagram illustrating a shift example of information exchanged between the information processing apparatus 100 and the information processing apparatus 200 according to the third embodiment of the present disclosure. FIG. 28 illustrates an example of exchange of information corresponding to FIGS. 27A, 27B and 27C.

FIG. 27A illustrates an example of the case in which an image and sound of the image from the information processing apparatus 200 are output from the information processing apparatus 100. That is, FIG. 27A illustrates an example in which, with setting of audio included, stream transmission is performed from the information processing apparatus 200 to the information processing apparatus 100 using Wi-Fi CERTIFIED Miracast (361, 362 illustrated in FIG. 28). In this case, sound 351 of the image from the information processing apparatus 200 is output from the sound output unit 150.

FIG. 27B illustrates an example of the case in which, in the state illustrated in FIG. 27A, it is determined that a user is not viewing the screen displayed on the display 140 (363 illustrated in FIG. 28).

For example, it is possible to detect the existence of a person or the movement of a person by the sensor 120. Moreover, the controller 170 of the information processing apparatus 100 can determine whether the user is viewing the screen of the display 140 based on the detection result by the sensor 120. Then, when it is determined that the user is not viewing the screen of the display 140 for a certain period of time, the controller 170 of the information processing apparatus 100 turns off sound output from the sound output unit 150.

In this case, the information processing apparatus 100 transmits the RTSP M110 request message (illustrated in FIG. 10) to the information processing apparatus 200 and requests reduction of audio data (364, 365 illustrated in FIG. 28). The information processing apparatus 200 transmits an OK in the RTSP M110 response message (illustrated in FIG. 10) to the information processing apparatus 100 (366, 367 illustrated in FIG. 28).

Subsequently, the information processing apparatus 200 transmits a stream in which the audio data is reduced to the information processing apparatus 100 (368, 369 illustrated in FIG. 28). In this case, sound of the image from the information processing apparatus 200 is not output, as illustrated in FIG. 27B.

Moreover, in this case, the controller 170 of the information processing apparatus 100 can display notification information indicating "sound has been deleted after determination that there is no viewer" on the display 140, as illustrated in FIG. 27B. Moreover, the controller 170 of the information processing apparatus 100 may call an attention of a user by outputting warning sound, for example. When the user performs some kinds of action (e.g., action of waving a hand) or given reaction from the sensor 120 is observed within a given period of time after the output of such notification or warming sound, for example, the information processing apparatus 100 may not request reduction of audio data.

Moreover, when it is determined that the user is not viewing the screen of the display 140 for a certain period of time, the controller 170 of the information processing apparatus 100 may gradually reduce a sound volume setting value (volume value) of sound output from the sound output unit 150. In this case, the controller 170 of the information processing apparatus 100 may request reduction of audio data after the sound volume setting value (volume value) of sound output from the sound output unit 150 is reduced sufficiently.

Moreover, when it is determined that the user is not viewing the screen of the display 140 for a certain period of time, the controller 170 of the information processing apparatus 100 may transmit a request for reducing power consumption to the information processing apparatus 200. For example, the controller 170 of the information processing apparatus 100 can transmit a request for reducing resolution of the image, or reducing a refresh rate, for example, to the information processing apparatus 200.

FIG. 27C illustrates an example of the case in which, in the state illustrated in FIG. 27B, the user viewing the screen displayed on the display 140 has been detected (370 illustrated in FIG. 28). For example, it is assumed that the user having viewed the message illustrated in FIG. 27B returns to the side of the information processing apparatus 100. Moreover, the existence of the user may be detected under the condition that the user performs given action (e.g., action of waving a hand, etc.).

In this case, the information processing apparatus 100 transmits the RTSP M110 request message (illustrated in FIG. 11) to the information processing apparatus 200 and requests addition of audio data (371, 372 illustrated in FIG. 28). The information processing apparatus 200 transmits an OK in the RTSP M110 response message (illustrated in FIG. 11) to the information processing apparatus 100 (373, 374 illustrated in FIG. 28).

Subsequently, the information processing apparatus 200 transmits a stream containing audio data to the information processing apparatus 100 (375, 376 illustrated in FIG. 28). In this case, sound 352 of the image from the information processing apparatus 200 is output from the sound output unit 150, as illustrated in FIG. 27C.

In this manner, the third embodiment of the present disclosure is substantially same as the first embodiment of the present disclosure except in a trigger for requesting reduction of audio data.

"Operation Example of Sink Device"

FIG. 29 and FIG. 30 are flowcharts illustrating an example of processing procedures of reception processing by the information processing apparatus 100 according to the third embodiment of the present disclosure. FIG. 29 and FIG. 30 illustrate an example of the case in which both the source device and the sink device are adaptive to the specific function. Moreover, the processing procedures illustrated in FIG. 29 and FIG. 30 (Steps S871, S872, S874, S884 to S886, S888 to S890) correspond to the processing procedures illustrated in FIG. 14 (Steps S801 to S803, S805 to S807, S809 to S811). Thus, the description thereof is partially omitted.

Moreover, a dotted rectangle 601 illustrated in FIG. 29 corresponds to determination processing for determining whether audio data is necessary (Step S808) in FIG. 14. Moreover, a dotted rectangle 602 illustrated in FIG. 30 corresponds to determination processing for determining whether audio data is unnecessary (Step S804) in FIG. 14.

After starting a session of Wi-Fi CERTIFIED Miracast (Step S872), the controller 170 resets the first timer (Step S873). Here, the first timer is a timer used for determining whether notification information for a user is to be output. Next, the controller 170 performs processing of receiving, decoding, and reproducing a stream containing audio data, for example (Step S874).

Subsequently, the controller 170 determines whether the existence or movement of a user has been detected by the sensor 120 (Step S875). When the existence or movement of the user has been detected (Step S875), the operation returns to Step S873.

When the existence or movement of the user has not been detected (Step S875), the controller 170 increases a value of the first timer (Step S876). Then, the controller 170 determines whether the first timer has exceeded an upper limit value (Step S877). When the first timer has not exceeded the upper limit value (Step S877), the operation returns to Step S874.

When the first timer has exceeded the upper limit value (Step S877), the controller 170 resets the second timer (Step S878). Here, the second timer is a timer used for determining whether reduction of audio data is to be requested to the source device. Then, the controller 170 outputs (e.g., displays or sound outputs) notification information for the user (Step S879).

Subsequently, the controller 170 determines whether the existence or movement of the user has been detected by the sensor 120 (Step S880). When the existence or movement of the user has been detected (Step S880), the controller 170 resets the second timer (Step S881), and the operation returns to Step S873.

When the existence or movement of the user has not been detected (Step S880), the controller 170 a value of increases the second timer (Step S882). Then, the controller 170 determines whether the second timer has exceeded an upper limit value (Step S883). When the second timer has not exceeded the upper limit value (Step S883), the operation returns to Step S879. When the second timer has exceeded the upper limit value (Step S883), the operation proceeds to Step S884.

Moreover, the controller 170 determines whether the existence or movement of the user has been detected by the sensor 120 (Step S887). When the existence or movement of the user has been detected (Step S887), the operation proceeds to Step S888. By contrast, when the existence or movement of the user has not been detected (Step S887), the operation returns to Step S886.

In this manner, a trigger for requesting the source device to reduce audio data and transmit the data (first trigger) can be a trigger caused by detection of a user existing around the information processing apparatus 100 or the movement of the user.

Note that the operation example of the source device is same as in FIG. 15, and thus the description thereof is omitted here.

As described above, in the embodiment of the present disclosure, in a transmission method using an MPEG2-TS, the source device reduces audio data and transmits the data when notified by the connected sink device of the fact that audio data is unnecessary. For example, the source device can reduce audio data stored in a payload of a PES packet and transmit the data without changing a PID. In this manner, the source device can appropriately adjust a data amount of audio elementary stream in accordance with a request from the connected sink device.

Thus, in the embodiment of the present disclosure, when audio is unnecessary, a data amount required for a wireless section can be reduced, which can prevent collision or congestion. Moreover, it is possible to reduce power consumption of both the source device and the sink device.

Moreover, when the sink device operates in audio master, it is possible to perform synchronous reproduction based on a PTS.

A sink device capable of reproducing video in free run of an audio reproduction clock can request the source device to perform transmission without including even a PTS. In this manner, it is possible to avoid collision or congestion by further reduction of a data amount and reduce power consumption of both the source device and the sink device.

Moreover, it is possible to add and reduce audio data in association with switching operation of a main screen and a sub screen (e.g., user operation), automatic movement such as addition of a display screen, or whether a user is viewing a screen. In this case, it is unnecessary to perform complicated user operation for adding and reducing audio data.

Note that the first and second embodiments of the present disclosure describe examples of the case in which an image based on broadcast waves and an image from the source device are displayed at the same time on the sink device. However, the first and the second embodiment of the present disclosure can be applied similarly also when images from two or more source devices are displayed at the same time on the sink device, or when a plurality of images from one source device are displayed at the same time on the sink device. Moreover, the third embodiment of the present disclosure describes an example of the case in which an image from one source device is displayed on the sink device. However, the third embodiment of the present disclosure can be applied similarly also when images from two or more source devices are displayed at the same time on the sink device.

4. Application Example

The technology according to the disclosure can be applied to various products. For example, the information processing apparatuses 100, 200, and 210 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing apparatuses 100, 200, and 210 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing apparatuses 100, 200, and 210 may be wireless communication modules mounted in such terminals (for example, integrated circuit modules configured by one die).

On the other hand, for example, the information processing apparatuses 100, 200, and 210 may be realized as a wireless LAN access point (also referred to as a wireless base station) which has a router function or does not have a router function. The information processing apparatuses 100, 200, and 210 may be realized as a mobile wireless LAN router. The information processing apparatuses 100, 200, and 210 may also be a wireless communication module (for example, an integrated circuit module configured with one die) mounted on the device.

4-1. First Application Example

FIG. 31 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED)

display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 31. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 31 via power supply lines partially indicated by dashed lines in the drawing. The auxiliary controller 919 causes, for example, required minimum functions of the smartphone 900 to be operated in a sleep mode.

In the smartphone 900 shown in FIG. 31, the control unit 170 described with reference to FIG. 2 may be mounted in the wireless communication interface 913. At least some of the functions may be mounted on the processor 901 or the auxiliary controller 919.

Note that the smartphone 900 may operate as a wireless access point (software AP) as the processor 901 executes the function of an access point at an application level. In addition, the wireless communication interface 913 may have the function of a wireless access point.

4-2. Second Application Example

FIG. 32 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 32. In this case, the antenna switch 934 may be omitted from the configuration of the car navigation device 920.

The battery 938 supplies electric power to each of the blocks of the car navigation device 920 shown in FIG. 32 via power supply lines partially indicated by dashed lines in the drawing. In addition, the battery 938 accumulates electric power supplied from the vehicle.

In the car navigation device 920 shown in FIG. 32, the control unit 170 described with reference to FIG. 2 may be mounted in the wireless communication interface 933. At least some of the functions may be mounted on the processor 921.

The wireless communication interface 933 may operate as the above-described information processing apparatuses 100, 200, and 210 to supply wireless connection to a terminal owned by a user boarding a vehicle.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

4.3. Third Application Example

FIG. 33 is a block diagram showing an example of a schematic configuration of a wireless access point 950 that communicates with an information processing apparatus to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 33, the control unit 170 described with reference to FIG. 2 may be mounted in the wireless communication interface 963. At least some of the functions may be mounted on the controller 951.

Also, the above-described embodiment illustrates one example for realizing the present technology, and matters in the embodiment and technology specifying matters in the scope of claims have correspondence relation respectively. Similarly, the technology specifying matters in the scope of claims and the matters in the embodiment of the present technology, to which the same names are attached, have the correspondence relation respectively. However, the present technology is not limited to the embodiment and can be realized by variously modifying the embodiment without departing from the spirit of the technology.

Also, the processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a computer disc (CD), a minidisc (MD), a digital versatile disc (DVD), a memory card, and a Blu-ray® disc or the like are usable.

Effects described in the present description are just examples, the effects are not limited, and there may be other effects.

Additionally, the present technology may also be configured as below.

(1) An information processing apparatus comprising:
circuitry configured to
receive a multiplexed image signal and sound signal from another information processing apparatus using a moving picture experts group (MPEG) 2-transport stream (TS); and
perform control to cause reduction of data contained in a packetized elementary stream (PES) payload in a PES packet packed in a transport (TS) packet specified by a packet identifier (PID) specifying sound data transmission described in a program map table (PMT) and to extract a presentation time stamp (PTS) contained in a PES header portion of the PES packet after requesting the another information processing apparatus to reduce a sound data amount.

(2) The information processing apparatus according to (1), wherein the circuitry makes the request to the another information processing apparatus based on a first trigger.

(3) The information processing apparatus according to (1), wherein the circuitry specifies, when making the request to the another information processing apparatus, one of a first sound data reduction method in which the MPEG2-TS multiplex signal containing the PES packet carrying sound data is generated and transmitted and a second sound data reduction method in which the MPEG2-TS multiplex signal not containing the PES packet carrying sound data is generated and transmitted.

(4) The information processing apparatus according to (1), wherein the circuitry makes the request to the another information processing apparatus to reduce the sound data amount based on a first trigger, and wherein the circuitry performs control to extract sound data contained in the PES payload to demultiplex an MPEG2-TS multiplex signal received from the another information processing apparatus after requesting the another information processing apparatus to restore an original sound data amount based on a second trigger while receiving the MPEG2-TS multiplex signal in which the sound data amount is reduced.

(5) The information processing apparatus according to (4), wherein the first trigger and the second trigger are caused by user operation.

(6) The information processing apparatus according to (2), wherein the first trigger is caused by detection of a user exiting an area around the information processing apparatus or movement of the user.

(7) The information processing apparatus according to (1), wherein the circuitry retains a sound volume setting value of sound output before the request is made, requests the another information processing apparatus to restore an original sound data amount, and sets the retained sound volume setting value at a timing when sound data contained in the PES payload is extracted after the request to restore the original sound data amount.

(8) The information processing apparatus according to (1), wherein the circuitry requests the another information processing apparatus to restore an original sound data amount, and adjust a sound volume when sound data contained in the PES payload from the another information processing apparatus is extracted after the request to restore the original sound data amount.

(9) An information processing apparatus comprising:
circuitry configured to
transmit a multiplexed image signal and sound signal to another information processing apparatus using a moving picture experts group (MPEG) 2-transport stream (TS); and
perform control to reduce a packetized elementary stream (PES) payload data amount in a PES packet stored in a TS packet specified by a packet identifier (PID) specifying sound data transmission described in a program map table (PMT), based on a request from the another information processing apparatus, without changing the PID and to multiplex and transmit the PES packet for sound signal transmission in which the data amount is reduced and the PES packet for image signal transmission.

(10) The information processing apparatus according to (9), wherein the circuitry performs control to reduce a data amount, when requested to reduce a sound data amount from the another information processing apparatus, by making the PES payload data amount to substantially zero or completely zero.

(11) The information processing apparatus according to (9), wherein the circuitry performs control to store, when requested to restore an original sound data amount from the another information processing apparatus while transmitting the PES packet for sound signal transmission in which the data amount is reduced and the PES packet for image signal transmission after multiplexing, normal sound data in the PES payload, and to multiplex and transmit the PES packet for sound signal transmission and the PES packet for image signal transmission.

(12) The information processing apparatus according to (9), wherein the circuitry performs control to perform, when requested to use sound data reduction other than a first sound data reduction to reduce a sound data amount from the another information processing apparatus in which the MPEG2-TS multiplex signal containing the PES packet carrying sound data is generated and transmitted, second sound data reduction in which the PES packet carrying sound data is not generated without including information of the PID specifying sound data in the PMT, and to transmit a PES packet for image signal transmission without multiplexing a PES packet for sound signal transmission.

(13) The information processing apparatus according to (12), wherein the circuitry performs control to store, when requested to restore an original sound data amount from the another information processing apparatus while transmitting the PES packet for image signal transmission without multiplexing the PES packet for sound signal transmission after the second sound data reduction is performed, normal sound data in the PES payload with the PID specifying sound data transmission included in the PMT, and to multiplex and transmit the PES packet for sound signal transmission and the PES packet for image signal transmission.

(14) A communication system comprising:
a first information processing apparatus having circuitry configured to transmit a multiplexed image signal and sound signal to a second information processing apparatus using a moving picture experts group (MPEG) 2-transport stream (TS), reduce a packetized elementary stream (PES) payload data amount in a PES packet stored in a TS packet specified by a packet identifier (PID) specifying sound data transmission described in a program map table (PMT), based on a request from the second information processing apparatus, without changing the PID, and to multiplex and transmit the PES packet for sound signal transmission in which the data amount is reduced and the PES packet for image signal transmission; and
a second information processing apparatus having circuitry configured to cause reduction of data contained in the PES payload in the PES packet packed in the TS packet specified by the PID specifying sound data transmission described in the PMT and to extract the PTS contained in the PES header portion after transmitting the request to the another information processing apparatus to reduce a sound data amount.

(15) An information processing method, implemented by an information processing apparatus, comprising:
performing, by circuitry of the information processing apparatus, communication to receive a multiplexed image signal and sound signal from another information processing apparatus using a moving picture experts group (MPEG) 2-transport stream (TS); and
performing, by the circuitry of the information processing apparatus, control to cause reduction of data contained in a packetized elementary stream (PES) payload in a PES packet packed in a TS packet specified by a packet identifier (PID) specifying sound data transmission described in a program map table (PMT) and to extract a PTS contained in a PES header portion after requesting the another information processing apparatus to reduce a sound data amount.

(16) An information processing method comprising:
performing, by circuitry of the information processing apparatus, communication to transmit a multiplexed image signal and sound signal to another information processing apparatus using a moving picture experts group (MPEG) 2-transport stream (TS); and
performing, by the circuitry of the information processing apparatus, control to reduce a packetized elementary stream (PES) payload data amount in a PES packet stored in a TS packet specified by a packet identifier (PID) specifying sound data transmission described in a program map table (PMT), based on a request from the another information processing apparatus, without changing the PID, and to multiplex and transmit the PES packet for sound signal transmission in which the data amount is reduced and the PES packet for image signal transmission.

(17) A non-transitory computer readable medium that stores a program that when executed by an information processing apparatus causes the information processing apparatus to perform a method comprising: performing communication to receive a multiplexed image signal and sound signal from another information processing apparatus using a moving picture experts group (MPEG) 2-transport stream (TS); and performing control to cause reduction of data contained in a packetized elementary stream (PES) payload in a PES packet packed in a TS packet specified by a packet identifier (PID) specifying sound data transmission described in a program map table (PMT) and to extract a PTS contained in a PES header portion after requesting the another information processing apparatus to reduce a sound data amount.

(18) A non-transitory computer readable medium that stores a program that when executed by an information processing apparatus causes the information processing apparatus to perform a method comprising:

performing communication to transmit a multiplexed image signal and sound signal to another information processing apparatus using a moving picture experts group (MPEG) 2-transport stream (TS); and performing control to reduce a packetized elementary stream (PES) payload data amount in a PES packet stored in a TS packet specified by a packet identifier (PID) specifying sound data transmission described in a program map table (PMT), based on a request from the another information processing apparatus, without changing the PID, and to multiplex and transmit the PES packet for sound signal transmission in which the data amount is reduced and the PES packet for image signal transmission.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 communication system
11 broadcasting station
50 source device
60 sink device
100, 200, 210 information processing apparatus
110 communication unit
111 data processing unit
112 transmission processing unit
113 wireless interface unit
114 antenna
120 sensor
130 operation reception unit
140 display
150 sound output unit
160 memory
170 controller
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle-side module
950 wireless access point
951 controller
952 memory
954 input device
955 display device
957 network interface
958 wired communication network
963 wireless communication interface
964 antenna switch
965 antenna

The invention claimed is:

1. A first information processing apparatus, comprising:
circuitry configured to:
receive a first image signal and a first sound signal from a second information processing apparatus based on a moving picture experts group (MPEG) 2-transport stream (TS);
receive a second image signal and a second sound signal from a third information processing apparatus;
transmit first control information to the second information processing apparatus, wherein the first control information indicates a reduction of an amount the first sound signal;
transmit second control information to the third information processing apparatus, wherein the second control information indicates a reduction of an amount of the second sound signal;
control at least one of the second information processing apparatus or the third information processing apparatus to stop output of data in at least one of a plurality of packetized elementary stream (PES) payloads, wherein
the output of the data is stopped based on at least one of the first control information or the second control information,
each of a plurality of PES packets includes a corresponding PES payload of the plurality of PES payloads,
each of the plurality of PES payloads is in a corresponding TS packet of a plurality of TS packets,
each of the plurality of TS packets is specified by a corresponding packet identifier (PID) of a plurality of packet identifiers (PIDs), and
each of the plurality of PIDs specifies at least one of the first sound signal or the second sound signal in a program map table (PMT); and
extract a presentation time stamp (PTS) included in a PES header portion of each of the plurality of PES packets.

2. The first information processing apparatus according to claim 1, wherein
the circuitry is further configured to transmit at least one of the first control information or the second control information to the second information processing apparatus or the third information processing apparatus based on a first trigger.

3. The first information processing apparatus according to claim 2, wherein
the first trigger is based on one of an exit of a user from an area or a user movement, and
the area is in specific proximity to the first information processing apparatus.

4. The first information processing apparatus according to claim 1, wherein
the circuitry is further configured to specify one of a first sound data reduction method or a second sound data reduction method to at least one of the second information processing apparatus or the third information processing apparatus,
in the first sound data reduction method, a first MPEG 2-TS multiplex signal is generated by the at least one of the second information processing apparatus or the third information processing apparatus,
the first MPEG 2-TS multiplex signal comprises the at least one of the first sound signal or the second sound signal,
in the second sound data reduction method, a second MPEG 2-TS multiplex signal is generated by the at least one of the second information processing apparatus or the third information processing apparatus, and
the second MPEG 2-TS multiplex signal is devoid of the at least one of the first sound signal or the second sound signal.

5. The first information processing apparatus according to claim 1, wherein the circuitry is further configured to:
transmit a first request to the at least one of the second information processing apparatus or the third information processing apparatus based on a first trigger, wherein the first request corresponds to a reduction of at least one of an original amount of the first sound signal or an original amount of the second sound signal;
receive at least one MPEG 2-TS multiplex signal that comprises at least one of the reduced original amount of the first sound signal or the reduced original amount of the second sound signal;
transmit a second request to the at least one of the second information processing apparatus or the third information processing apparatus based on a second trigger, wherein the second request corresponds to at least one of a restoration of the reduced original amount of the first sound signal to the original amount of the first sound signal or a restoration of the reduced original amount of the second sound signal to the original amount of the second sound signal; and
extract the at least one of the first sound signal or the second sound signal from the at least one MPEG 2-TS multiplex signal after the transmission of the second request.

6. The first information processing apparatus according to claim 5, wherein the first trigger and the second trigger are based on a user operation.

7. The first information processing apparatus according to claim 1, wherein the circuitry is further configured to:
retain a sound volume setting value of each of the first sound signal and the second sound signal;
transmit a first request to the at least one of the second information processing apparatus or the third information processing apparatus, wherein the first request corresponds to a reduction of at least one of an original amount of the first sound signal or an original amount of the second sound signal;
transmit a second request to the second information processing apparatus, wherein the second request corresponds to at least one of a restoration of the reduced original amount of the first sound signal to the original amount of the first sound signal or a restoration of the reduced original amount of the second sound signal to the original amount of the second sound signal; and
reset the retained sound volume setting value of each of the first sound signal and the second sound signal after the transmission of the second request.

8. A first information processing apparatus, comprising:
circuitry configured to:
transmit an image signal and a sound signal to a second information processing apparatus based on a moving picture experts group (MPEG) 2-transport stream (TS);
receive first control information from the second information processing apparatus;
stop output of data in a packetized elementary stream (PES) payload, wherein
the output of the data is stopped based on the received first control information,
a first PES packet includes the PES payload,
a TS packet includes the first PES packet,
the TS packet is specified by a packet identifier (PID),
the PID specifies the transmitted sound signal in a program map table (PMT), and
the PID is independent of the output of the data in the PES payload;
multiplex the first PES packet and a second PES packet to generate a first multiplexed PES packet, wherein the second PES packet includes the image signal; and
transmit the first multiplexed PES packet to the second information processing apparatus.

9. The first information processing apparatus according to claim 8, wherein
the circuitry is further configured to reduce an amount of the data to substantially zero or completely zero, and
the reduction is based on the received first control information.

10. The first information processing apparatus according to claim 8, wherein
the circuitry is further configured to:
receive second control information from the second information processing apparatus to restore an original amount of the data in the PES payload;
store the original amount of the data in the PES payload;
multiplex a third PES packet and the second PES packet to generate a second multiplexed PES packet; and
transmit the second multiplexed PES packet to the second information processing apparatus,
the third PES packet includes the PES payload with the original amount of the data, and
the data corresponds to the sound signal.

11. The first information processing apparatus according to claim 8, wherein the circuitry is further configured to:

receive second control information from the second information processing apparatus; and stop transmission of the first PES packet in the first multiplexed PES packet, wherein the transmission of the first PES packet is stopped based on the received second control information, the second control information is different from the first control information, and the PMT is devoid of the PID corresponding to the first PES packet.

12. The first information processing apparatus according to claim 11, wherein the circuitry is further configured to:

receive third control information from the second information processing apparatus to restore an original amount of the data in the PES payload;

store the original amount of the data in the PES payload;

multiplex a third PES packet and the second PES packet to generate a second multiplexed PES packet; and transmit the second multiplexed PES packet to the second information processing apparatus, the third PES packet includes the PES payload with the original amount of the data, and the data corresponds to the sound signal.

13. A communication system, comprising:

a first information processing apparatus comprising first circuitry configured to:

transmit an image signal and a sound signal to a second information processing apparatus based on a moving picture experts group (MPEG) 2-transport stream (TS);

receive control information from the second information processing apparatus;

stop output of data in a packetized elementary stream (PES) payload, wherein the output of the data is stopped based on the received control information, a first PES packet includes the PES payload, a TS packet includes the first PES packet, the TS packet is specified by a packet identifier (PID), the PID specifies the transmitted sound signal in a program map table (PMT), and the PID is independent of the output of the data in the PES payload;

multiplex the first PES packet and a second PES packet to generate a first multiplexed PES packet, wherein the second PES packet includes the image signal; and transmit the first multiplexed PES packet to the second information processing apparatus; and the second information processing apparatus comprising second circuitry configured to:

transmit the control information to the first information processing apparatus to reduce an amount of the sound signal; and control the first information processing apparatus to stop the output of the data in the PES payload, wherein the output of the data is stopped based on the control information.

14. An information processing method, comprising:

in a first information processing apparatus:

receiving a first image signal and a first sound signal from a second information processing apparatus based on a moving picture experts group (MPEG) 2-transport stream (TS);

receiving a second image signal and a second sound signal from a third information processing apparatus;

transmitting first control information to the second information processing apparatus, wherein the first control information indicates a reduction of an amount of the first sound signal;

transmitting second control information to the third information processing apparatus, wherein the second control information indicates a reduction of an amount of the second sound signal;

controlling at least one of the second information processing apparatus or the third information processing apparatus to stop output of data in at least one of a plurality of packetized elementary stream (PES) payloads, wherein the output of the data is stopped based on at least one of the first control information or the second control information, each of a plurality of PES packets includes a corresponding PES payload of the plurality of PES payloads, each of the plurality of PES payloads is packed in a corresponding TS packet of a plurality of TS packets, each of the plurality of TS packets is specified by a corresponding packet identifier (PID) of a plurality of packet identifiers (PIDs), and each of the plurality of PIDs specifies at least one of the first sound signal or the second sound signal in a program map table (PMT); and extracting a presentation time stamp (PTS) included in a PES header portion of each of the plurality of PES packets.

15. An information processing method, comprising:

in a first information processing apparatus:

transmitting an image signal and a sound signal to a second information processing apparatus based on a moving picture experts group (MPEG) 2-transport stream (TS);

receiving control information from the second information processing apparatus;

stopping output of data in a packetized elementary stream (PES) payload, wherein the output of the data is stopped based on the received control information, a first PES packet includes the PES payload, a TS packet includes the first PES packet, the TS packet is specified by a packet identifier (PID), the PID specifies the transmitted sound signal in a program map table (PMT), and the PID is independent of the output of the data included in the PES payload;

multiplex the first PES packet and a second PES packet to generate a multiplexed PES packet, wherein the second PES packet includes the image signal; and transmitting the multiplexed PES packet to the second information processing apparatus.

16. A non-transitory computer readable medium having stored thereon computer executable instruction which, when executed by a computer of a first information processing apparatus, cause the computer to execute operations, the operations comprising:

receiving a first image signal and a first sound signal from a second information processing apparatus based on a moving picture experts group (MPEG) 2-transport stream (TS);

receiving a second image signal and a second sound signal from a third information processing apparatus;

transmitting first control information to the second information processing apparatus, wherein the first control information indicates a reduction of an amount of the first sound signal;
transmitting second control information to the third information processing apparatus, wherein the second control information indicates a reduction of an amount of the second sound signal;
controlling at least one of the second information processing apparatus or the third information processing apparatus to stop output of data in at least one of a plurality of packetized elementary stream (PES) payloads, wherein
  the output of the data is stopped based on at least one of the first control information or the second control information,
  each of a plurality of PES packets includes a corresponding PES payload of the plurality of PES payloads,
  each of the plurality of PES payloads is packed in a corresponding TS packet of a plurality of TS packets,
  each of the plurality of TS packets is specified by a corresponding packet identifier (PID) of a plurality of packet identifiers (PIDs), and
  each of the plurality of PIDs specifies at least one of the first sound signal or the second sound signal in a program map table (PMT); and
extracting a presentation time stamp (PTS) included in a PES header portion of each of the plurality of PES packets.

17. A non-transitory computer readable medium having stored thereon computer executable instruction which, when executed by a computer of a first information processing apparatus, cause the computer to execute operations, the operations comprising:
  transmitting an image signal and a sound signal to a second information processing apparatus based on a moving picture experts group (MPEG) 2-transport stream (TS);
  receiving control information from the second information processing apparatus;
  stopping output of data in a packetized elementary stream (PES) payload, wherein
    the output of the data is stopped based on the received control information,
    a first PES packet includes the PES payload,
    a TS packet includes the first PES packet,
    the TS packet is specified by a packet identifier (PID),
    the PID specifies the transmitted sound signal in a program map table (PMT), and
    the PID is independent of the output of the data in the PES payload;
  multiplex the first PES packet and a second PES packet to generate a multiplexed PES packet, wherein the second PES packet includes the image signal; and
  transmitting the multiplexed PES packet to the second information processing apparatus.

* * * * *